US006314298B1

(12) United States Patent
Hiroki

(10) Patent No.: US 6,314,298 B1
(45) Date of Patent: Nov. 6, 2001

(54) WIRELESS COMMUNICATIONS SYSTEM HAVING A COMMUNICATIONS APPARATUS ACCOMMODATING COMMUNICATION LINES AND A WIRELESS COMMUNICATIONS APPARATUS WIRELESSLY CONNECTED TO SAID APPARATUS, AND METHOD OF CONTROLLING SAID SYSTEM

(75) Inventor: Shigeru Hiroki, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/968,350

(22) Filed: Nov. 12, 1997

(30) Foreign Application Priority Data

Nov. 19, 1996 (JP) .................................................. 8-308010

(51) Int. Cl.[7] ...................................................... H04Q 7/20

(52) U.S. Cl. .......................... 455/465; 455/462; 455/426; 455/567

(58) Field of Search .................................... 455/422, 517, 455/403, 550, 414, 555, 462, 465, 567, 426, 425, 424, 564, 417, 561; 379/199, 200, 201, 372, 373

(56) References Cited

U.S. PATENT DOCUMENTS 4,731,814 * 3/1988 Becker et al. ....................... 455/343
4,776,001 * 10/1988 Murata et al. ....................... 455/462
4,893,335 * 1/1990 Fuller et al. ......................... 379/200
4,955,050 * 9/1990 Yamauchi ............................ 455/555
4,995,075 * 2/1991 Angiolillo-Bent et al. ......... 379/142
5,062,133 * 10/1991 Melrose ........................... 379/88.24
5,325,420 * 6/1994 Kikuchi ............................... 455/463
5,371,781 * 12/1994 Ardon ................................. 455/414
5,519,762 * 5/1996 Bartlett ................................ 455/343
5,559,860 * 9/1996 Mizikovsky ......................... 455/413
5,577,104 * 11/1996 Knuth et al. ........................... 379/67
5,606,597 * 2/1997 Newland ............................. 455/464
5,675,629 * 10/1997 Raffel et al. ........................ 455/553
5,745,852 * 4/1998 Khan et al. .......................... 455/433
5,758,281 * 5/1998 Emery et al. ........................ 455/433
5,852,777 * 12/1998 Harrison ............................. 455/414
5,911,120 * 6/1999 Jarett et al. .......................... 455/417
5,946,636 * 8/1999 Uyeno et al. ........................ 455/566

OTHER PUBLICATIONS

PCT WO 94/06254 Van Os Cordless telephone system with different ringing patterns, Mar. 1994.*

* cited by examiner

*Primary Examiner*—Tracy Legree
*Assistant Examiner*—Jean A Gelin
(74) *Attorney, Agent, or Firm*—Morgan & Finnegan, LLP

(57) ABSTRACT

The pattern of intermittence of an incoming call signal from a communication line is reflected in the way a wireless communications apparatus such as a cordless telephone is rung. To achieve this, a master set discriminates the intermittence of an incoming call signal from a communication line in a single communication and sends a master set information in which the intermittence of the incoming call signal from the communication line is reflected. On the basis of the information reflecting the intermittence of the incoming call signal from the communication line, the slave set notifies the user of the incoming call in a way that reflects the pattern of intermittence of the incoming call from the communication line.

68 Claims, 22 Drawing Sheets

STANDBY STATE
S301
INCOMING CALL DETECTED ?
NO
YES
NOTIFY OF INCOMING CALL
S302
ESTABLISH WIRELESS LINK
S303
S304
IS INCOMING CALL SIGNAL CURRENTLY BEING DETECTED ?
NO
YES
S306
DO NOT TRANSMIT FIXED VALUE A
TRANSMIT FIXED VALUE A
S305
S307
ANSWER MESSAGE RECEIVED FROM SLAVE SET ?
NO
YES
S308
HAS TIME RUN OUT IN INCOMING-CALL MONITORING TIMER ?
NO
YES
COMMUNICATION IN PROGRESS

R
SS
PR
UW
CI
SA
TCH
CRC

TELEPHONE LINE
1301
MAIN UNIT
1302
LINE INTERFACE
1304
EXTENSION INTERFACE
1305
MAIN-UNIT CONTROLLER
1303
EXTENSION
1306
MASTER SET
1307
MAIN-UNIT LINE INTERFACE
1309
WIRELESS INTERFACE ON MASTER SIDE
1310
MASTER CONTROLLER
1308
SLAVE SET
1311
WIRELESS INTERFACE ON SLAVE SIDE
1313
CONTROL PANEL
1315
SLAVE CONTROLLER
1312
INCOMING CALL BELL
1314

WIRELESS COMMUNICATIONS SYSTEM HAVING A COMMUNICATIONS APPARATUS ACCOMMODATING COMMUNICATION LINES AND A WIRELESS COMMUNICATIONS APPARATUS WIRELESSLY CONNECTED TO SAID APPARATUS, AND METHOD OF CONTROLLING SAID SYSTEM

BACKGROUND OF THE INVENTION

1. Field of the Invention

This invention relates to a wireless communications system having a communications apparatus, which accommodates a communication line, and a wireless communications apparatus wirelessly connected to this apparatus, and to a method of controlling this communications system.

2. Description of the Related Art

In the prior art notification of an incoming call arriving at an analog trunk is given by causing the intermittence of an incoming call signal having a certain fixed frequency. (The frequency used most widely in Japan in 16 Hz, while that used in the United States is 20 Hz). A telephone connected to the analog trunk causes an incoming call bell to ring when the incoming call signal is being sent to the telephone from the analog trunk. When the incoming call signal stops arriving from the analog trunk, the telephone halts the ringing of the bell. In other words, the telephone connected to the analog trunk causes a pattern representing the intermittence of the incoming call signal sent from the analog trunk to be reflected as is in the way the incoming call bell is rung.

Telephone exchanges include those of the type which change the intermittence of the incoming call signal depending upon the type of originator. FIG. 22 illustrates an example of a pattern representing the intermittence of an incoming call signal in a telephone exchange of this kind. According to Pattern 1, the incoming call signal continues for one second and is halted for two seconds. According to Pattern 2, continuation of the incoming call signal for 250 milliseconds and halting of the incoming call signal for 250 milliseconds is repeated twice, after which the incoming call signal is halted for two seconds. According to Pattern 3, continuation of the incoming call signal for 250 milliseconds and halting of the incoming call signal for 250 milliseconds is repeated three times, after which the incoming call signal is halted for 1.5 seconds. When an incoming call signal arrives at a telephone connected to an extension in a certain private branch exchange (PBX), for example, Pattern 1 is used for an incoming call signal from an outside line, Pattern 2 for an incoming call signal from an extension and Pattern 3 for an incoming call signal that has been transferred from an outside line. The user of the telephone connected to this extension of the private branch exchange can recognize the type of originator by the difference in the ringing of the incoming call bell.

A cordless telephone comprises a master set and a slave set. When an incoming call signal from an analog trunk is detected by the master set, the master set transmits a control signal which notifies the slave set of the incoming call. Upon receiving this control signal giving notification of the incoming call, the slave set causes the incoming call bell to ring according to a single pattern, regardless of whether the call is from an extension or outside line or is a transferred call, until a control signal halting the ringing of the bell arrives from the master set or until the slave set is taken off the hook.

The specification of Japanese Patent Application Laid-Open No. 3-114340 discloses an arrangement in which the master set discriminates whether an incoming call is from an extension or outside line and changes the tone (the frequency) of the ringing bell at the slave set accordingly.

The specification of Japanese Patent Application Laid-Open No. 5-55999 discloses an arrangement in which an incoming call tone from a telephone line or an incoming call tone produced by a master set is transmitted to the slave set by a speech channel and a ringing tone is produced by speaker at the slave set.

However, in the prior-art cordless telephone comprising master and slave sets as set forth above, the slave set, upon receiving the control signal giving notification of the incoming call, causes the incoming call bell to ring according to the same pattern regardless of whether the call is from an extension or outside line. As a consequence, the intermittence of the incoming call signal from the analog trunk cannot be reflected in the way the incoming call bell of the slave set is rung, thus making it impossible for the user to determined the type of originator (extension, outside line, transfer, etc.) from the difference in the ringing pattern of the bell.

Further, the wireless communications apparatus of the kind described in Japanese Patent Application Laid-Open No. 3-114340 requires a sound source for each different type of tone, resulting in an apparatus of increased size.

Further, the wireless communications apparatus of the kind described in Japanese Patent Application Laid-Open No. 5-55999 is such that the incoming call tone passes through a wireless link. This results in an incoming call tone of poor quality.

SUMMARY OF THE INVENTION

Accordingly, an object of the present invention is to cause the pattern of intermittence of an incoming call signal from a communication line to be reflected in the way a wireless communications apparatus such as a cordless telephone is rung.

Another object of the present invention is to make it possible to discriminate the type of originating party by the ringing tone without increasing the size of the wireless communications apparatus such as a cordless telephone.

A further object of the present invention is to reflect the pattern of intermittence of an incoming call signal from a communication line in the ringing of a wireless communications apparatus such as a cordless telephone without causing a deterioration in the quality of the ringing tone.

According to the present invention, the foregoing objects are attained by providing a wireless communications system having a master set accommodating a communication line and a slave set wirelessly connected to the master set, the master set comprising incoming call signal detecting means for detecting intermittence of an incoming call signal from the communication line by a single communication; and transmitting means for transmitting information, which reflects the intermittence of the incoming call signal, to the slave set based upon the intermittence of the incoming call signal detected by the incoming call signal detecting means; and the slave set comprises: receiving means for receiving, by a single communication, the information, which reflects the intermittence of the incoming call signal, transmitted by the transmitting means; and incoming call notification means for giving notification of the incoming call while causing the notification to reflect a pattern of intermittence of the incoming call signal from the communication line based upon the information received from the receiving means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

First Embodiment

Figure 2:
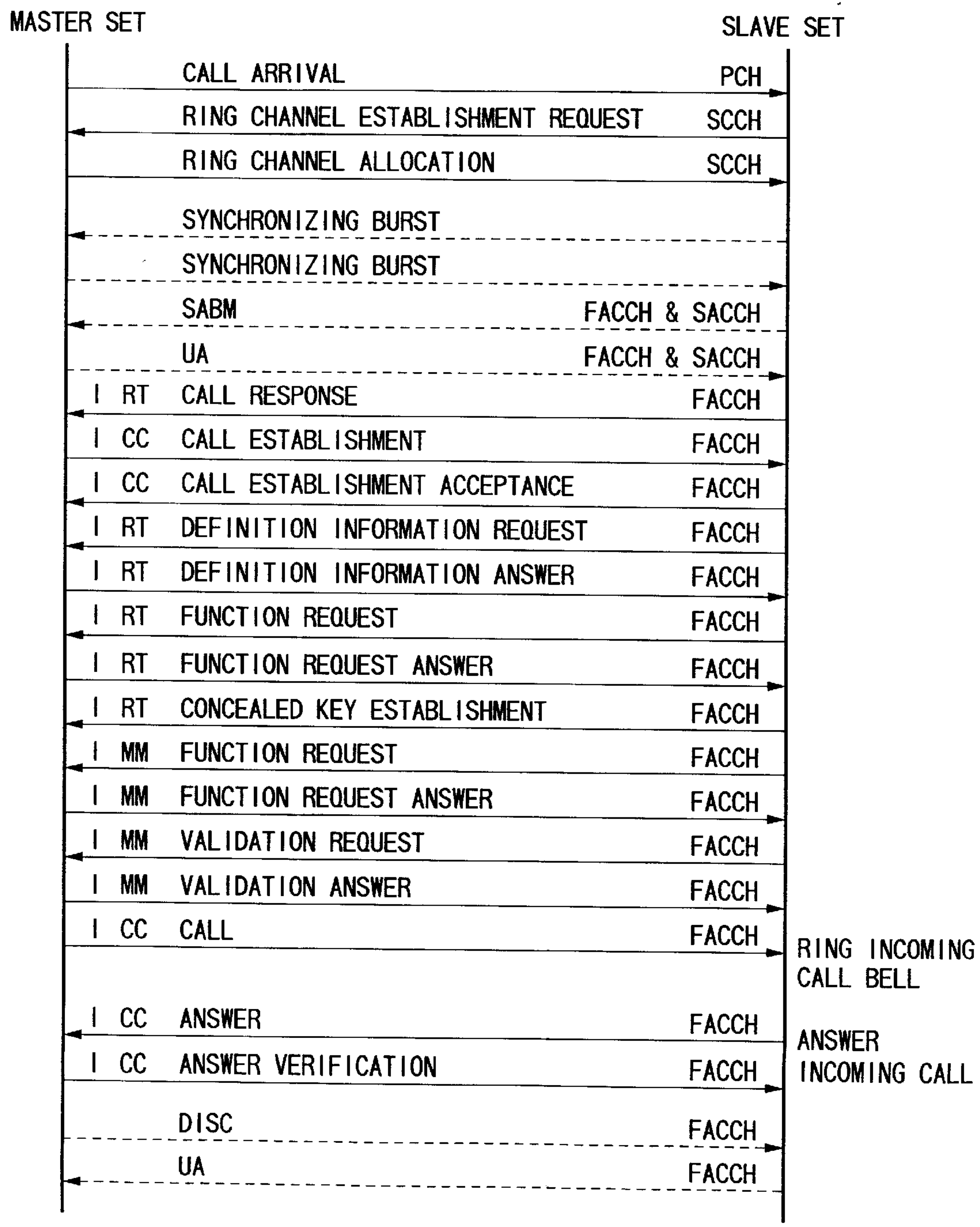
FIG. 2 shows an incoming call sequence in line with PHS standards.

In a first embodiment of the present invention, a wireless scheme will be described in accordance with the standards of the PHS (Personal Handyphone System) used in Japan as one type of a digital cordless telephone system. The standard will be referred to as the "PHS standard." FIG. 2 is a diagram showing an incoming call sequence in line with the PHS standard.

Figure 1:
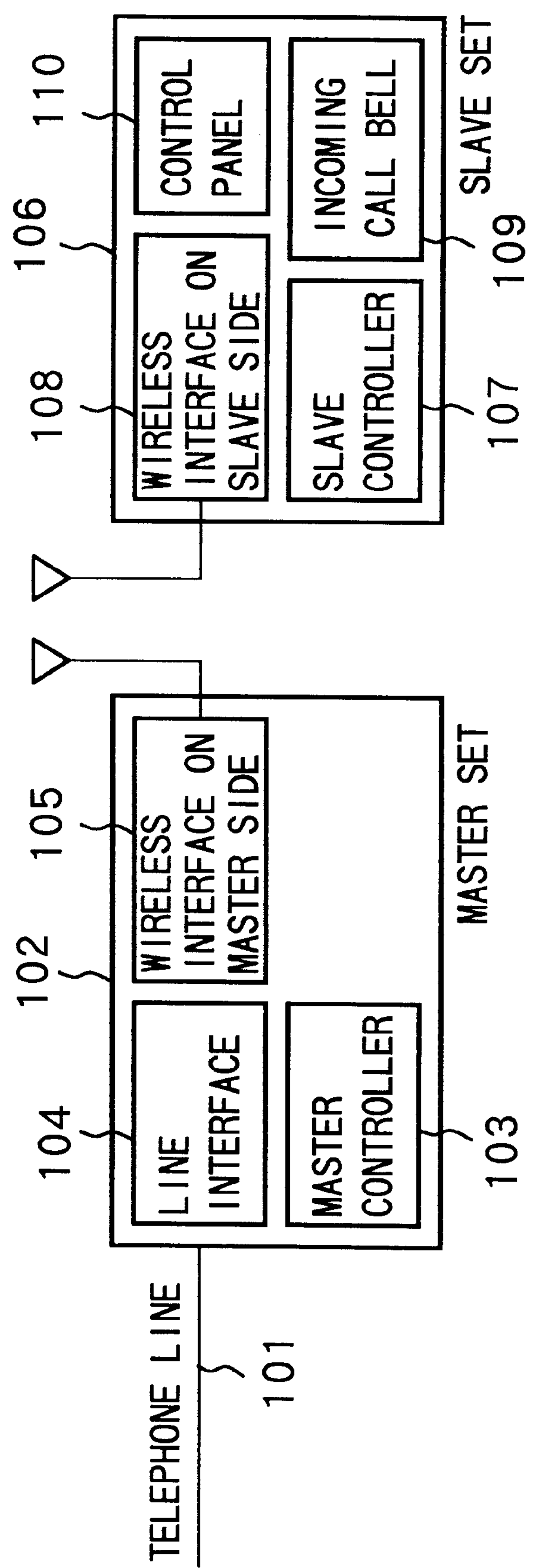
FIG. 1 is a block diagram of a wireless telephone according to first and second embodiments of the present invention.

FIG. 1 is a block diagram illustrating a first embodiment of a digital wireless telephone apparatus according to the present invention. The apparatus includes a telephone line 101, a master set 102 and a slave set 106. The master set 102 has a master controller 103 for reading out a program stored in a memory (not shown) such as a ROM and controlling the master set 102 in accordance with the program, a line interface 104 for detecting an incoming call from the telephone line 101, and a wireless interface 105 on the side of the master set. The slave set 106 includes a slave controller 107, which has an incoming-call monitoring timer for measuring a predetermined time, for reading out a program stored in a memory (not shown) such as a ROM and controlling the slave set 106 in accordance with the program, a wireless interface 108 on the side of the slave set, an incoming call bell 109, and a control panel 110 for performing on-hook and off-hook operations and for entering dialed numbers, etc.

Figure 3:
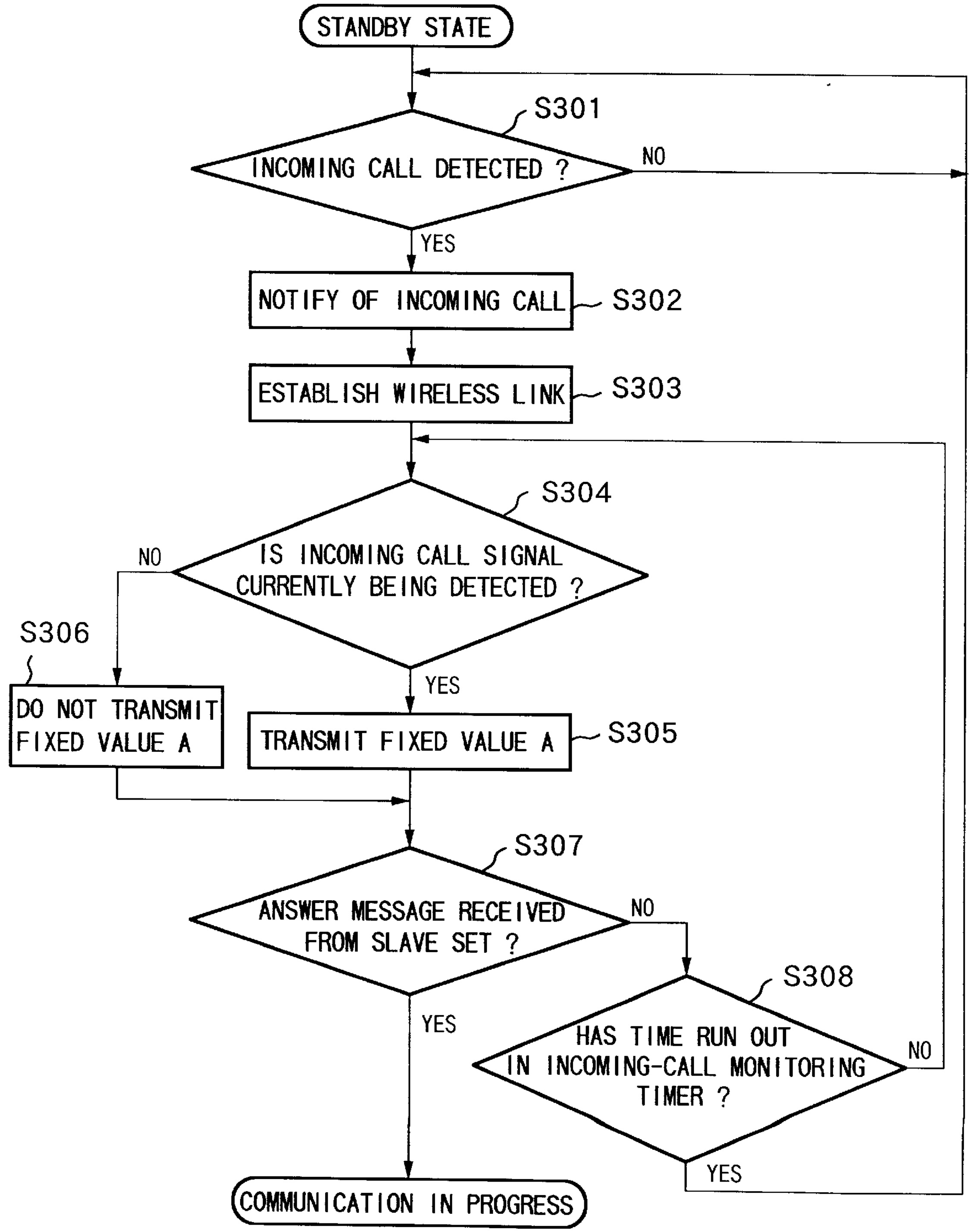
FIG. 3 is an flowchart showing the operation of a master set according to the first embodiment.
Figure 4:
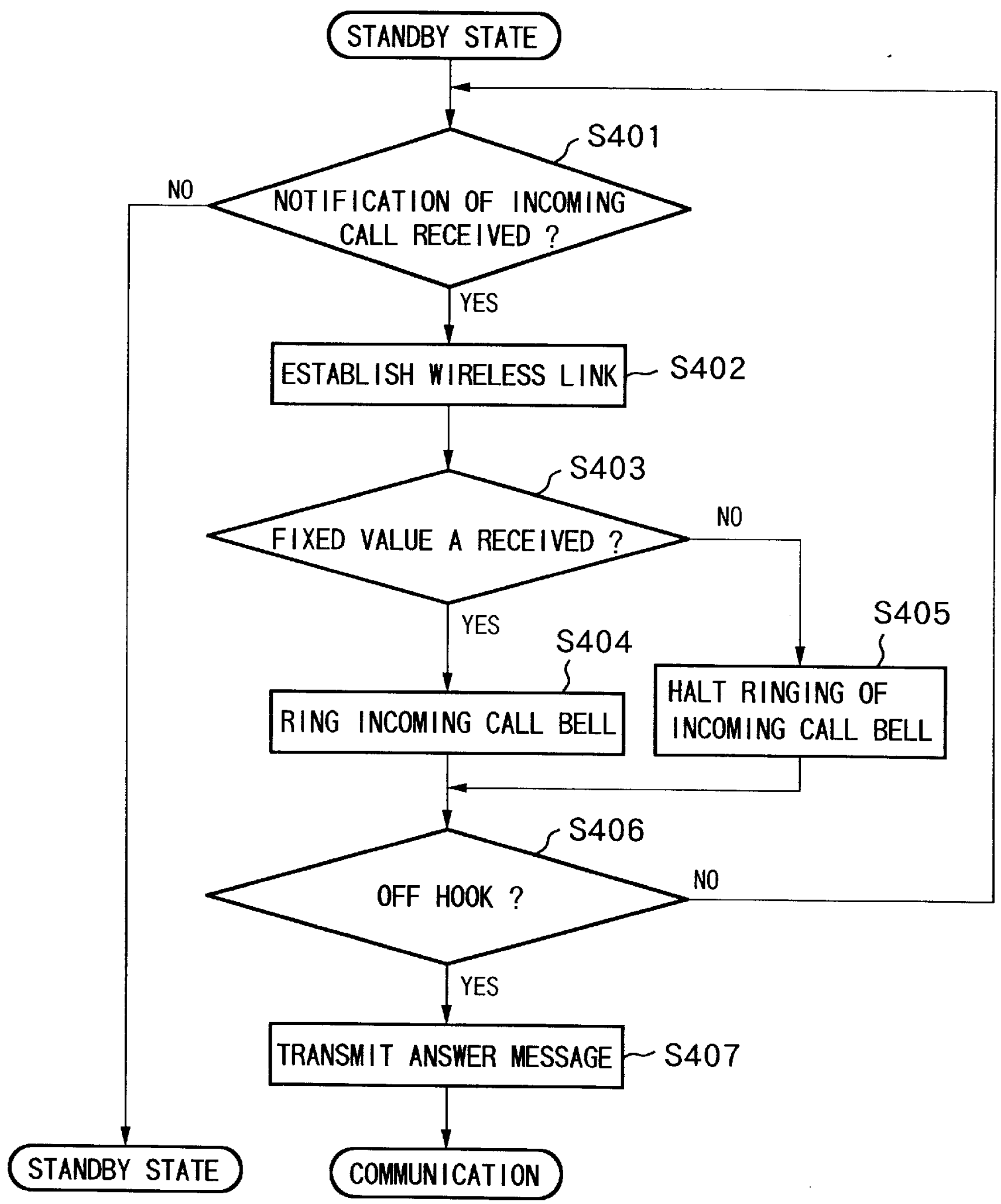
FIG. 4 is an flowchart showing the operation of a slave set according to the first embodiment.

FIGS. 3 and 4 are flowcharts showing the operation of the master set 102 and slave set 106, respectively, according to this embodiment of the invention.

When notification of an incoming call from the telephone line 101 is given by an incoming call signal having a fixed frequency (e.g., a 16-Hz incoming call signal in Japan or a 20-Hz incoming call signal in the USA), the master set 102 detects the incoming call at the line interface 104 and notifies the master controller 103 of the fact that the incoming call has been detected (step S301 in FIG. 3). Upon being notified of detection of the incoming call by the line interface 104, the master controller 103 of the master set 102 notifies the slave set 106 (S302) of the incoming call using the wireless interface 105 on the master side and establishes a wireless link with the slave set 106 (S303). The method of giving notification of the incoming call and the method of establishing the wireless link are in line with the PHS standard. After the wireless link has been established, the master controller 103 of the master set 102 continues transmitting a fixed value A from the wireless interface 105 to the slave set 106 for as long as the incoming call signal is being detected by the line interface 104 (S304, S305).

It is so arranged that the fixed value is not transmitted when the incoming call signal is not being detected (S306).

Next, at step S307, the master controller 103 determines whether an answer message has been received from the slave set 106 in response to the incoming call. If an answer message is not received via the wireless interface 105 on the master side, the master controller 103 repeats steps S304 through S307 until the incoming-call monitoring timer runs out of time (S308). When this occurs, the program returns to step S301.

When an answer message is received from the slave set 106 at step S307, the telephone line 101 and slave set 106 are put into communication with each other.

In FIG. 4, the slave controller 107 of the slave set 106 monitors the incoming-call notification from the master set 102 received via the wireless interface 108 on the slave side. When notification of an incoming call is received (S401), the slave controller 107 establishes a wireless link with the master set 102 (S402).

Upon receiving the fixed value A from the master set 102 via the wireless interface 108 on the slave side (S403), the slave controller 107 rings the incoming call bell 109 (S404) while the value A is being received and halts the ringing of the bell (S405) in the absence of the value A.

If an off-hook operation at the control panel 110 slave set 106 is detected (S406), the slave controller 107 transmits an answer message to the master set 102 via the wireless interface 108 on the slave side (S407), thereby establishing communication.

Figure 5:
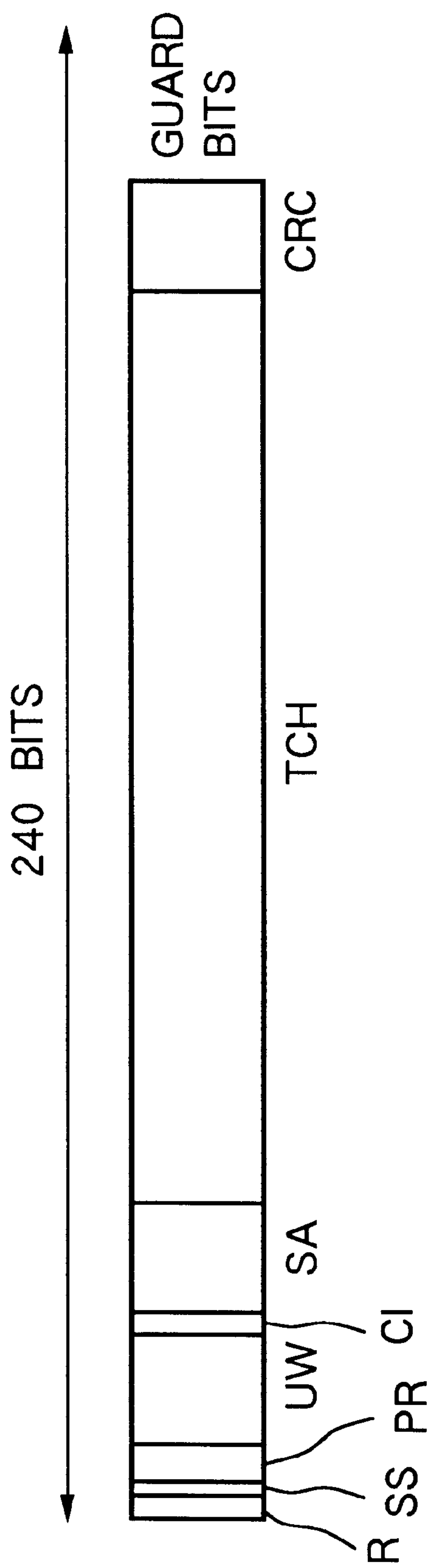
FIG. 5 shows the structure of a PHS physical slot, which slot includes an information channel.
Figure 6:
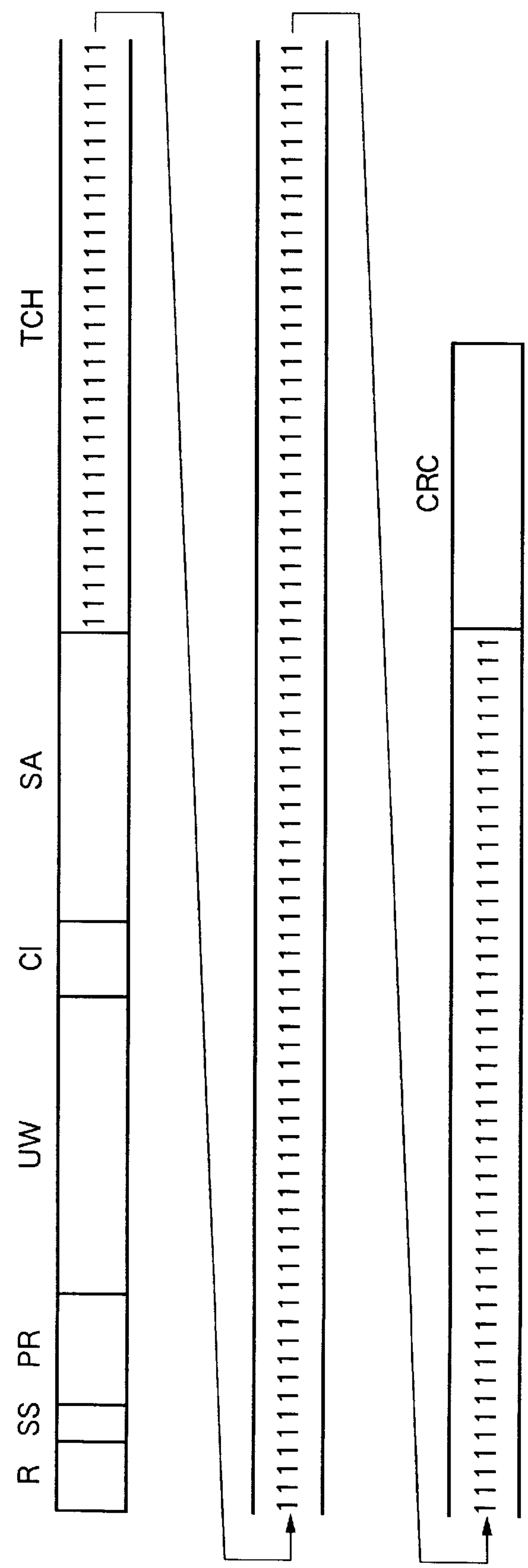
FIG. 6 illustrates an example in which the entire area of an information channel of this embodiment is mapped to "1"

An example of a method of sending and receiving the fixed value A is one which maps the fixed value to an information channel (TCH) stipulated by the PHS standard. A physical communication slot in PHS is composed of 240 bits inclusive of guard bits. FIG. 5 shows the structure of a PHS physical communication slot, which slot includes an information channel (TCH). Specifically, R (four bits) represents random time for transient response, SS (two bits) is a start symbol, PR (six bits) a preamble, UW (16 bits) a synchronizing words, CI (four bits) a channel classification, SA (16 bits) a low-speed collateral control channel, TCH (160 bits) an information channel and CRC (16 bits) a cyclic code for error correction. The information channel (TCH) is used to transfer a voice signal and is not employed at the time of an incoming call when voice transfer is not required. Accordingly, the information channel (TCH) can be used advantageously to transmit the fixed value A at the time of an incoming call. An example in which the entire area of the information channel (TCH) is mapped to "1"s, as shown in FIG. 6 can be mentioned as an example of the fixed value A. For as long as the incoming call signal is being detected by the master set 102, the master set sends the slave set 106 a message in which the entire area of the information channel (TCH) is a mapping of "1"s. The slave set 106 rings the incoming call bell 109 in a case where it has received such a message in which the entire area of the information channel (TCH) is a mapping of "1"s.

Conversely, it may be so arranged that the fixed value A is transmitted while an incoming call signal is not being detected by the line interface 104 of the master set 102. In such case the slave set 106 will ring the incoming call bell when the fixed value A is not being received.

Figure 7:
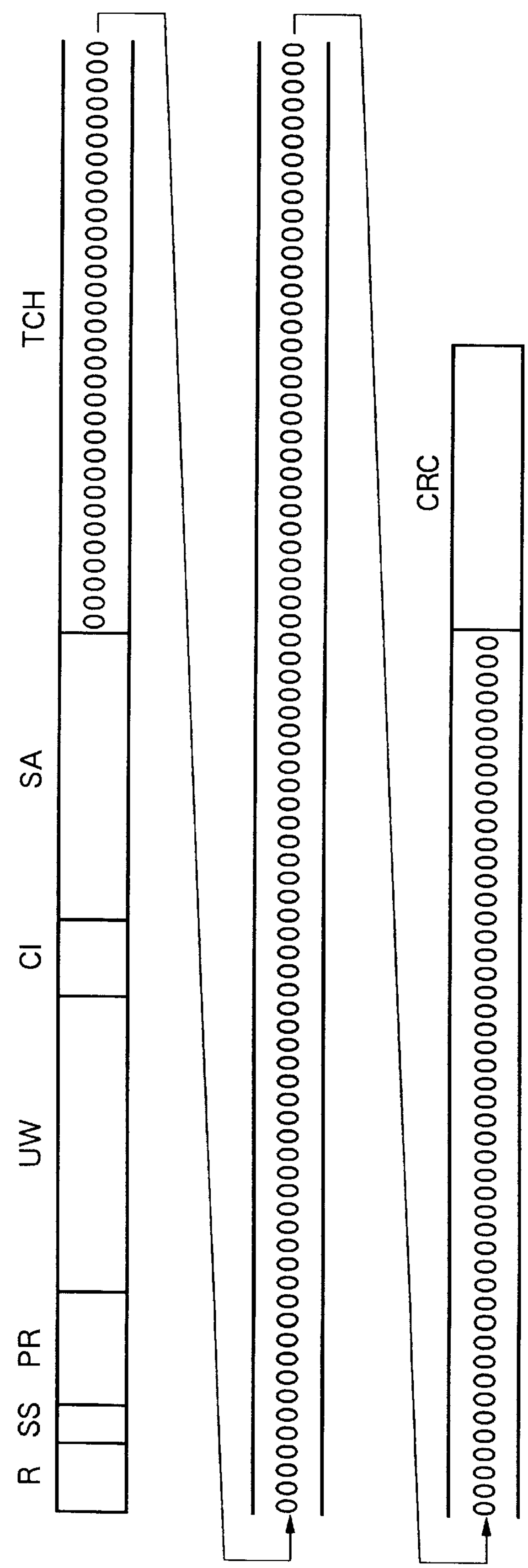
FIG. 7 illustrates an example in which the entire area of an information channel of this embodiment is mapped to "0"s.

In the description rendered above, the entire area of the information channel (TCH) is mapped to "1"s when the fixed value is transmitted. However, it is possible to adopt an arrangement in which the entire area of the information channel (TCH) is mapped to "1"s, as shown in FIG. 7.

Second Embodiment

A second embodiment of the present invention will now be described.

According to this embodiment, the fixed value A is transmitted to the slave set for as long as an incoming call signal from the telephone line is being detected, and a fixed signal B is transmitted to the slave set when an incoming call signal is not being detected.

A block diagram illustrating the digital wireless telephone apparatus according to this embodiment is identical with that in FIG. 1 and need not be described again.

Figure 8:
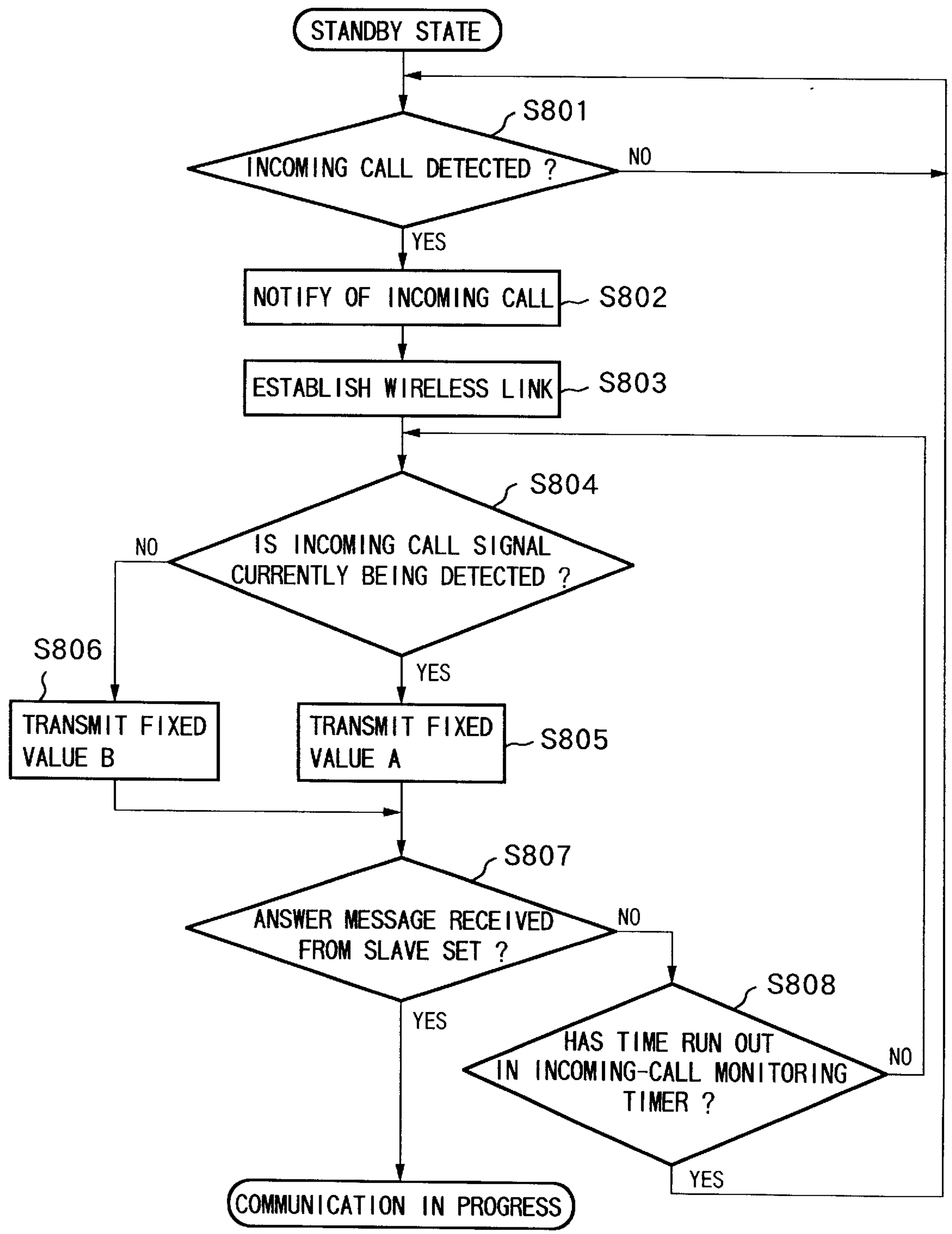
FIG. 8 is an flowchart showing the operation of a master set according to the second embodiment.
Figure 9:
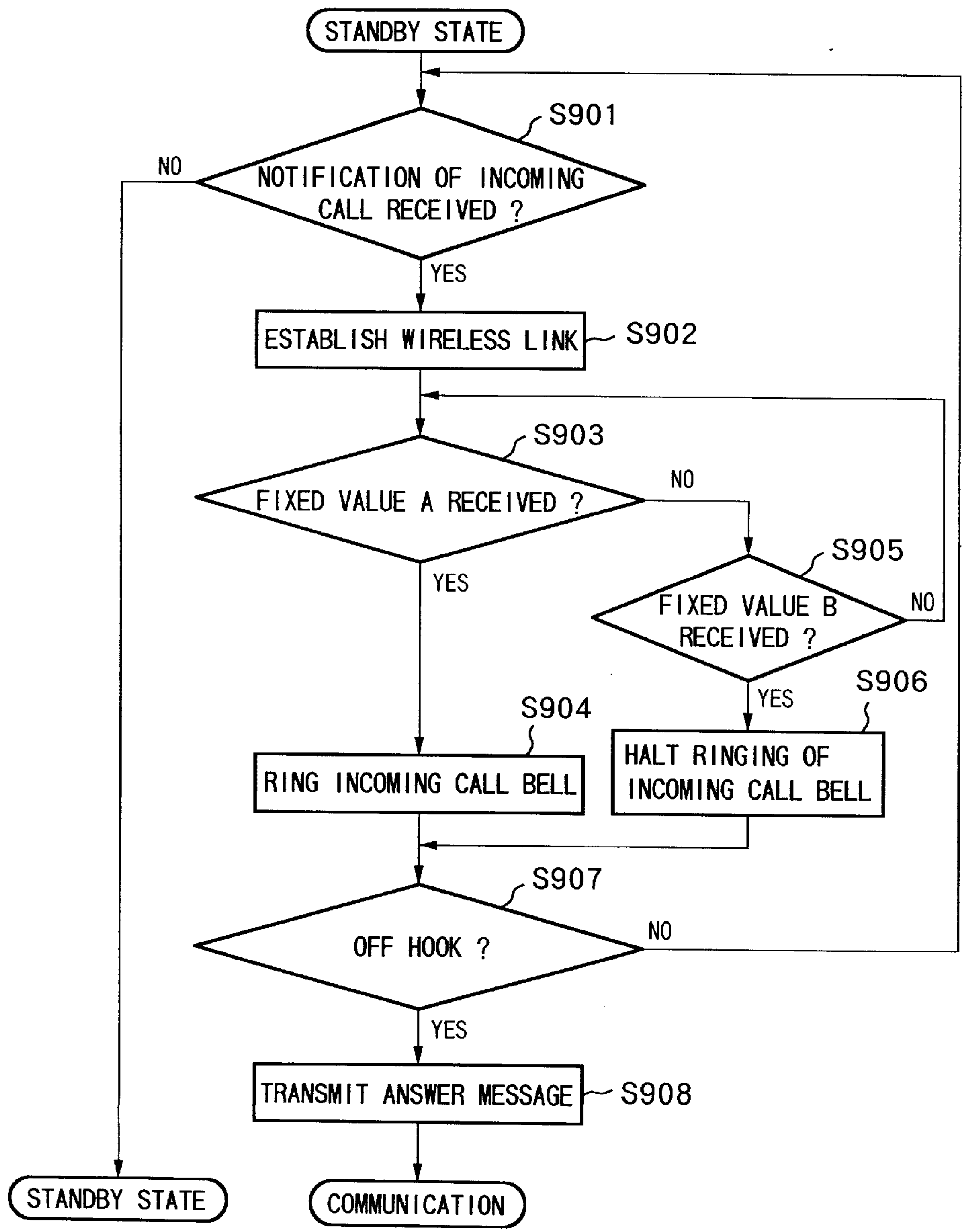
FIG. 9 is an flowchart showing the operation of a slave set according to the second embodiment.

FIGS. 8 and 9 are flowcharts showing the operation of the master set 102 and slave set 106, respectively, according to this embodiment of the invention.

When notification of an incoming call from the telephone line 101 is given by an incoming call signal having a fixed frequency (e.g., 16 Hz), the master set 102 detects the incoming call at the line interface 104 and notifies the master controller 103 of the fact that the incoming call has been detected (step S801 in FIG. 8). Upon being notified of detection of the incoming call by the line interface 104, the master controller 103 of the master set 102 notifies the slave set 106 (S802) of the incoming call using the wireless interface 105 on the master side and establishes a wireless link with the slave set 106 (S803). The method of giving notification of the incoming call and the method of establishing the wireless link are in line with the PHS standard. After the wireless link has been established, the master controller 103 of the master set 102 continues transmitting the fixed value A from the wireless interface 105 to the slave set 106 for as long as the incoming call signal is, being detected by the line interface 104 (S804, S805). The master controller 103 of the master set 102 continues transmitting a fixed value B from the wireless interface 105 to the slave set 106 as long as an incoming call signal is not being detected by the line interface 104 (S804, S806).

Next, at step S807, the master controller 103 monitors performs monitoring to determined whether an answer message in response to an incoming call has been received from the slave set 106. If an answer message is not received via the wireless interface 105 on the master side, the master controller 103 determines whether the incoming-call monitoring timer has run out of time (S808). The program returns to step S804 if time has not run out and to step S801 if time has run out.

When an answer message is received from the slave set 106 at step S807, communication is established. Upon receiving notification of an incoming call from the master set 102 at step S901 in FIG. 9, the slave controller 107 of the slave set 106 establishes a wireless link with the master set 102 (S902), rings the incoming call bell 109 for as long as the fixed value A is being received by the wireless interface 108 on the slave side and does not ring the incoming call bell 109 for as long as the fixed value B is being received by the wireless interface 108 (steps S903~S906).

If an off-hook operation at the control panel 110 of the slave set 106 is detected (S907), the slave controller 107 transmits an answer message to the master set 102 via the wireless interface 108 on the slave side (S908), thereby establishing communication.

Figure 10:
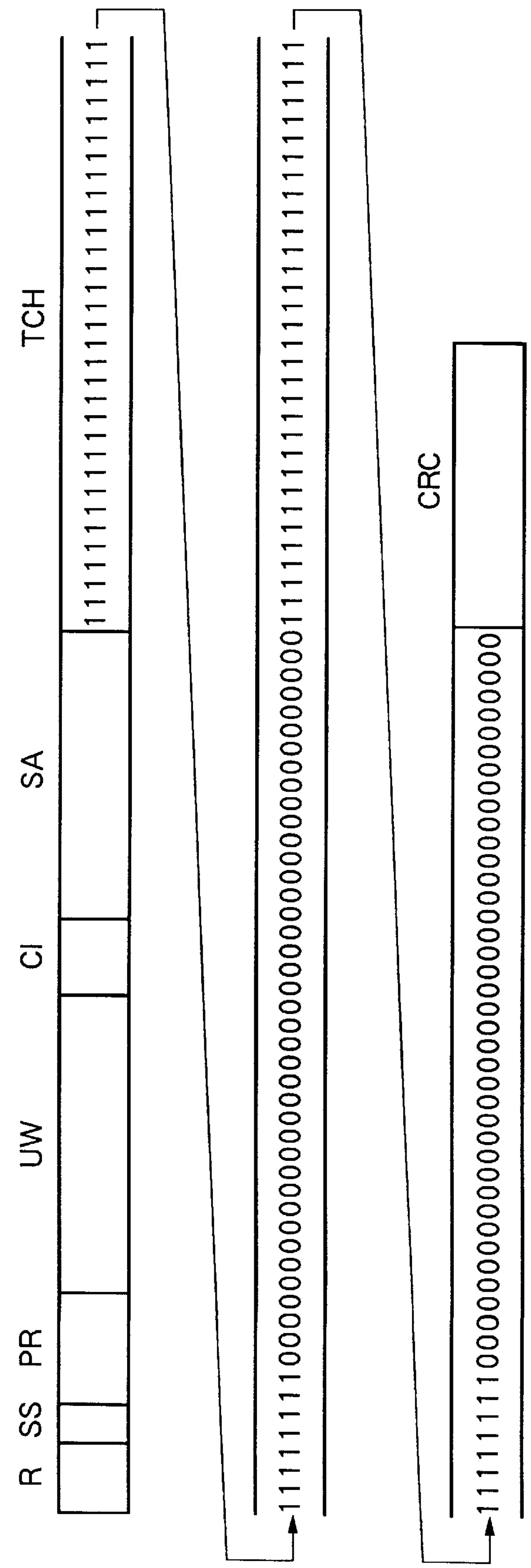
FIG. 10 is an example of a mapping of an information channel according to this embodiment of the invention.
Figure 11:
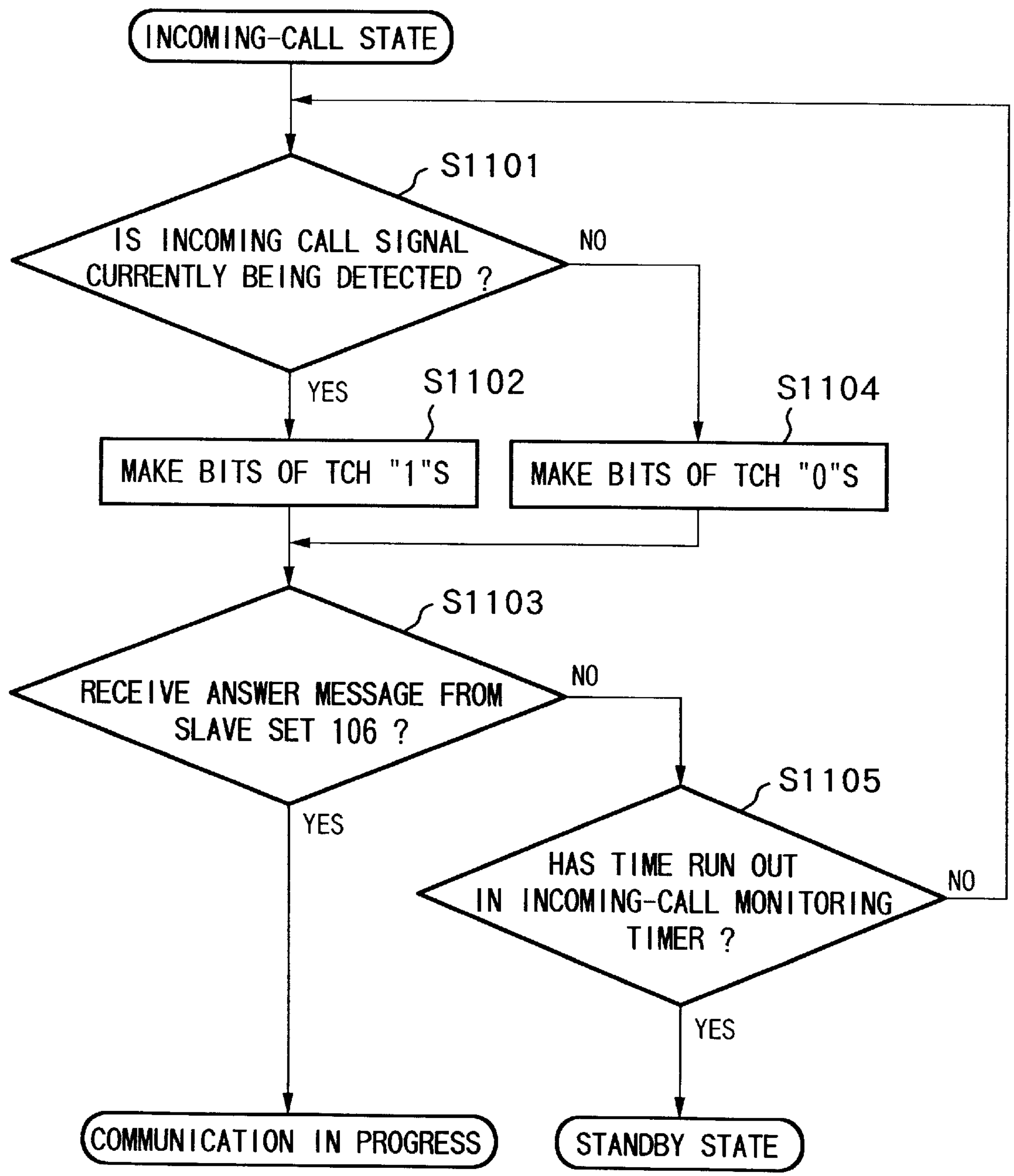
FIG. 11 is an flowchart showing the operation of a master set according to the second embodiment.
Figure 12:
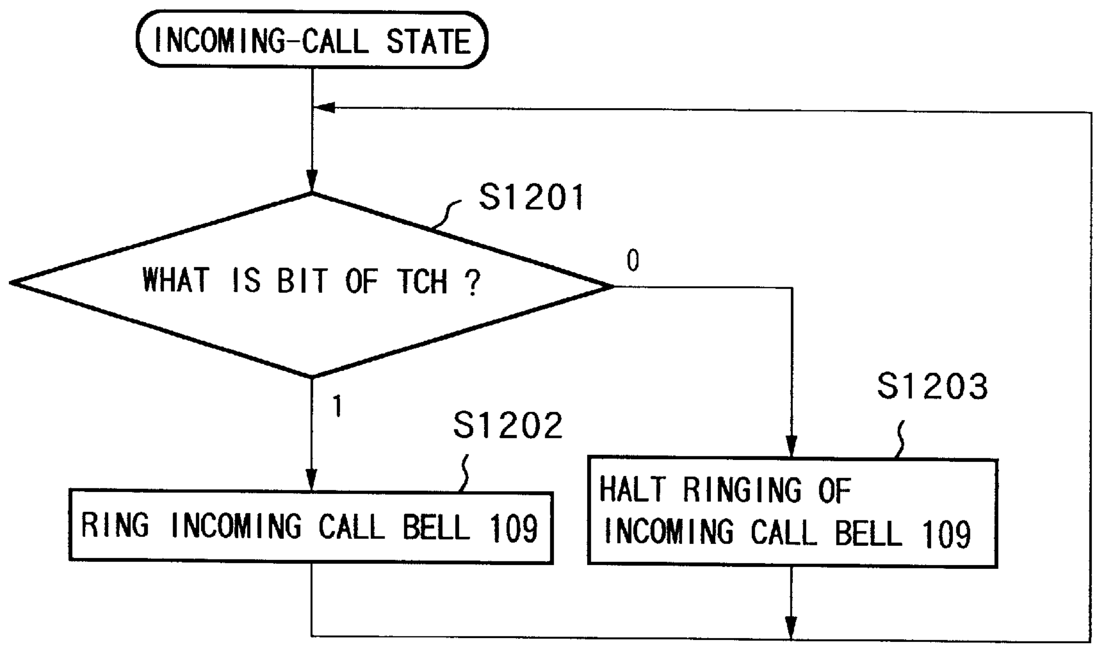
FIG. 12 is an flowchart showing the operation of a slave set according to the second embodiment.

An example of a method of sending and receiving the fixed values A and B is one which maps the fixed values to an information channel (TCH) stipulated by the PHS standard. For example, the bell is rung in a case where the bits of the information channel (TCH) are "1" s and ringing is halted in a case where the bits are "0"s, as shown in FIG. 10. FIGS. 11 and 12 are flowcharts showing the operation of the master set 102 and slave set 106, respectively, when this arrangement is adopted.

In FIG. 11, the master controller 103 of the master set 102 makes the bits of the information channel (TCH) "1"s for as long as an incoming call signal from the telephone line 101 is being detected at the line interface 104 (S1101, S1102) and makes the bits of the information channel (TCH) "0"s for as long as an incoming call signal is being detected at the line interface 104 (S1101, S1103). Meanwhile, the master controller 103 continues sending the slave set 106 the message containing the information channel (TCH). If the message containing the information channel (TCH) has been received, the slave controller 107 of the slave set 106 rings the incoming call bell 109 when a bit of the information channel (TCH) is "1" (S1201, S1202 in FIG. 12) and does not ring the incoming call bell 109 when a bit of the information channel TCH) is "0" (S1201, S1203).

If the master set 102 receives an answer message from the slave set 106 via the wireless interface 105 on the master side (S1103), the master set 102 establishes communication. Further, the master set 102 monitors time-out by the incoming-call monitoring timer (S1105) until an answer message is received from the slave set 106 and establishes a standby state if the answer message is not received by time-out.

Thus, in accordance with the first and second embodiments, intermittence of the incoming call signal on the telephone line 101 can be reflected in the way the incoming call bell of the slave set is rung. Accordingly, if the digital wireless telephone has been connected to the extension of a private branch exchange, for example, the user of the slave set can recognize the type of originating party by the difference in the ringing pattern of the bell. In particular, with the method of using the information channel (TCH) set forth in the second embodiment, the above can be achieved by simple logic wherein the bell is caused to ring when "1" has been mapped and is not caused to ring when "0" has been mapped. This makes design simpler in comparison with the first embodiment.

Third Embodiment

Figure 13:
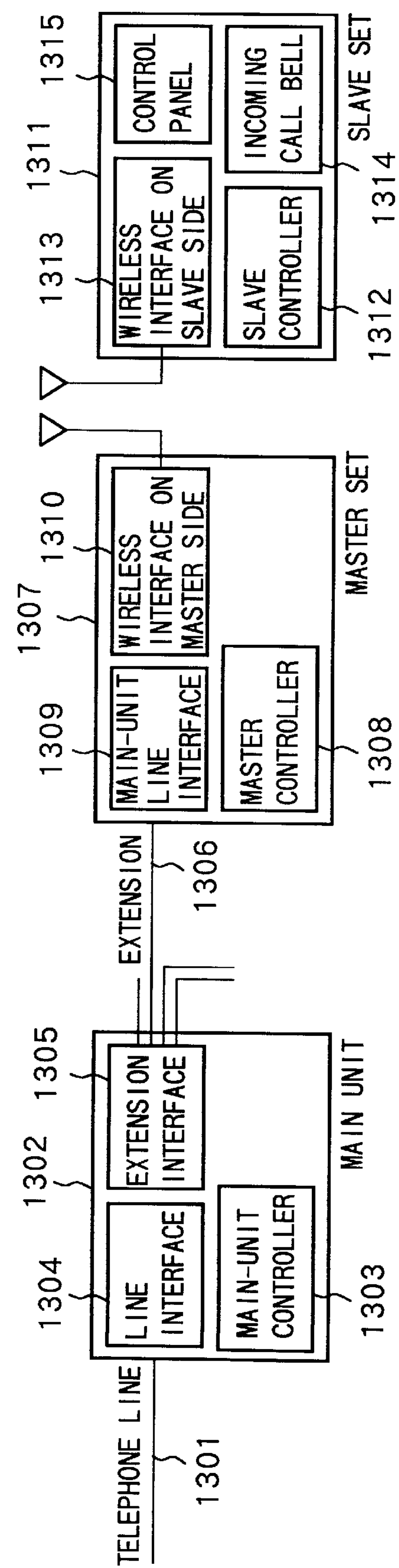
FIG. 13 is a block diagram of a wireless telephone according to third and fourth embodiments of the present invention.

FIG. 13 is a block diagram illustrating a third embodiment of a digital wireless telephone apparatus according to the present invention. The apparatus includes a telephone line 1301, a main unit 1302, an extension 1306, a master set 1307 and a slave set 1311. The main unit 1302 includes a main-unit controller 1303 for reading out a program stored in a memory (not shown) such as a ROM and controlling the main unit 1302 in accordance with the program, a line interface 1304 and an extension interface 1305. The master set 1307 includes a master controller 1308 for reading out a program stored in a memory (not shown) such as a ROM end controlling the master set 1307 in accordance with the program, a main-unit interface 1309 and a wireless interface 1310 on the master side. The slave set 1311 includes a slave controller 1312 for reading out a program stored in a memory (not shown) such as a ROM and controlling the slave set 1311 in accordance with the program, a wireless interface 1313 on the side of the slave set, an incoming call bell 1314, and a control panel 1315 for performing on-hook and off-hook operations and for entering dialed numbers, etc. The extension 1306 includes two types of physical digital channels, namely a control information transfer channel for transferring control information and a voice information transfer channel for transferring voice information.

Figure 14:
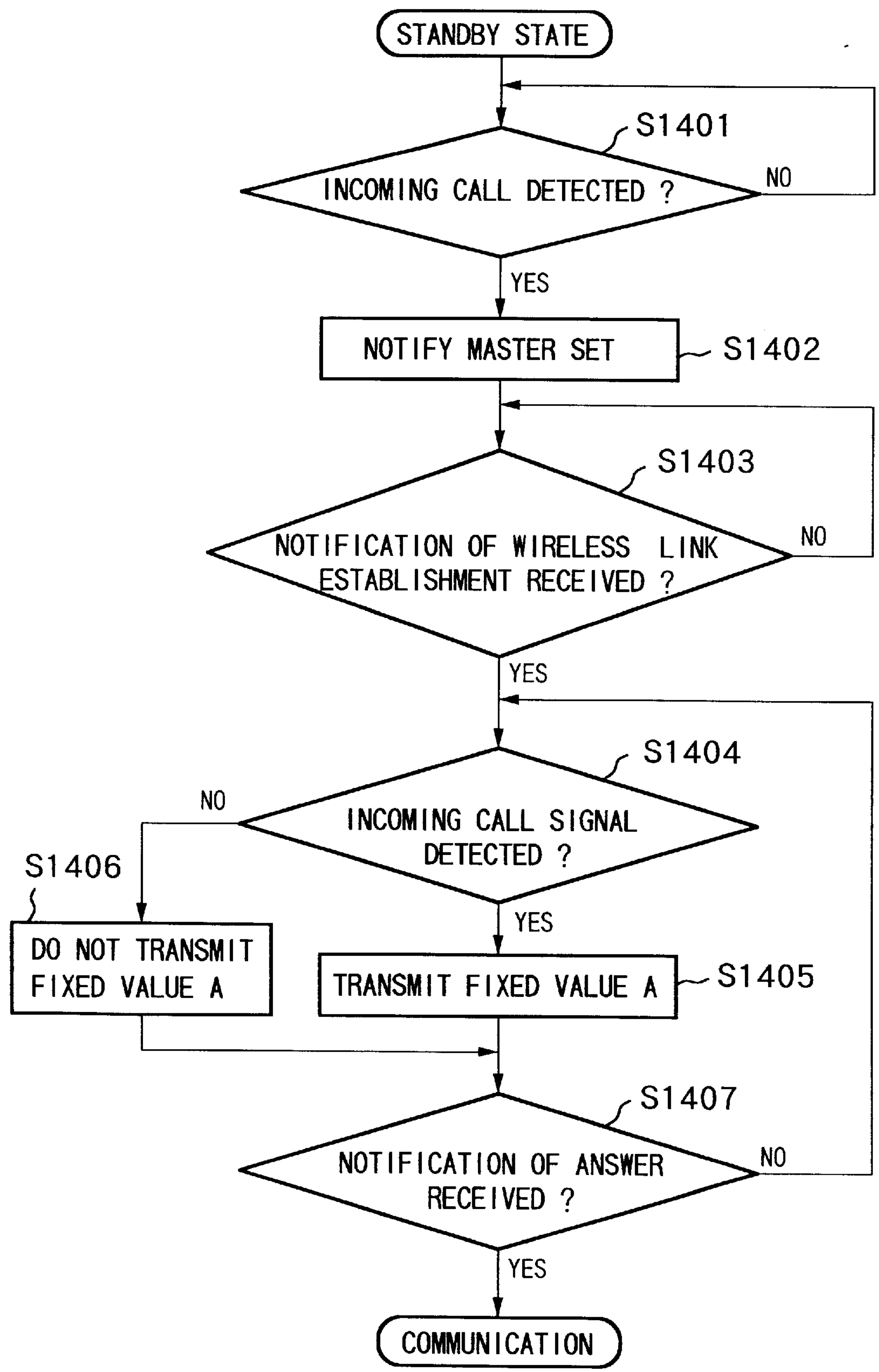
FIG. 14 is an flowchart showing the operation of a main unit according to the third embodiment.
Figure 15:
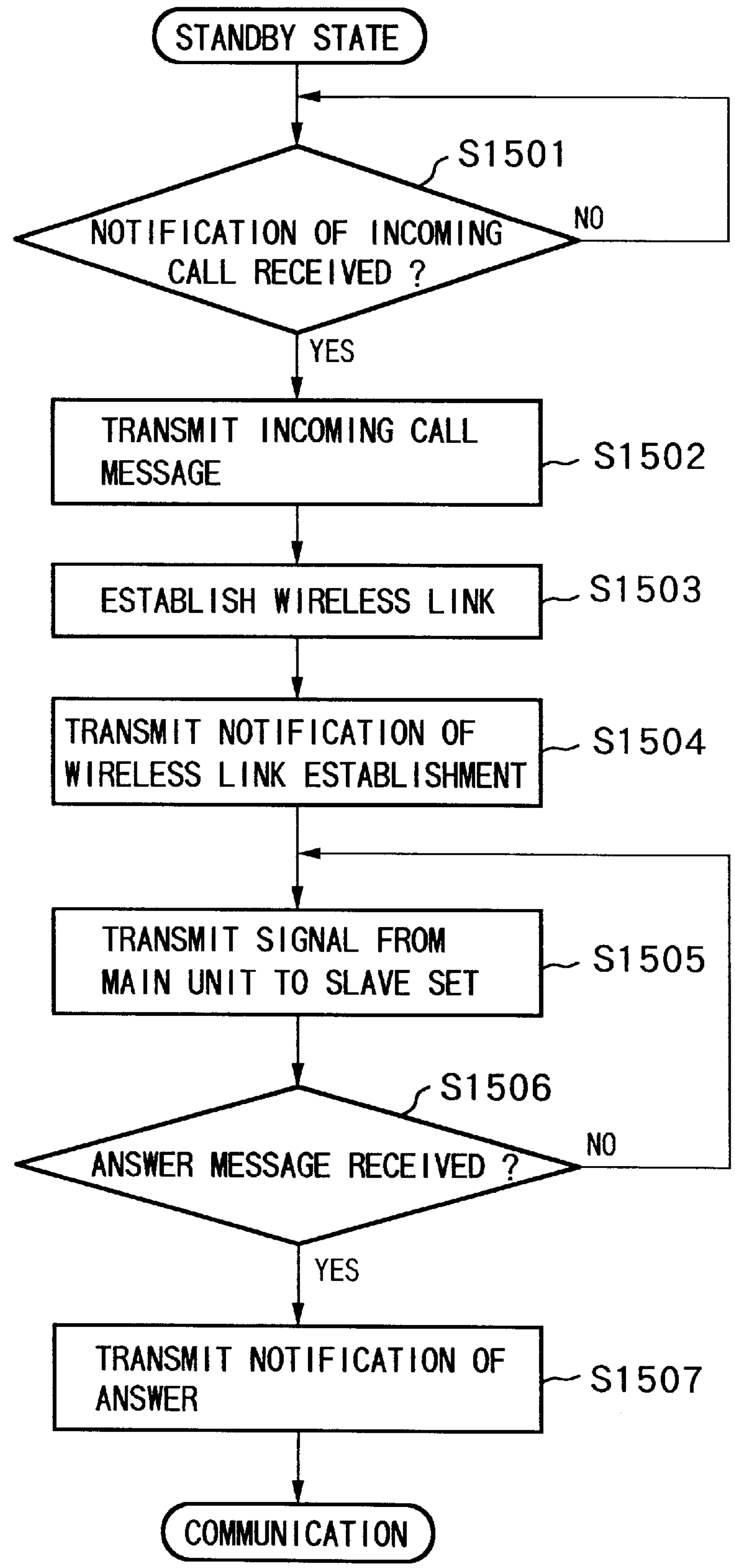
FIG. 15 is an flowchart showing the operation of a master set according to the third embodiment.
Figure 16:
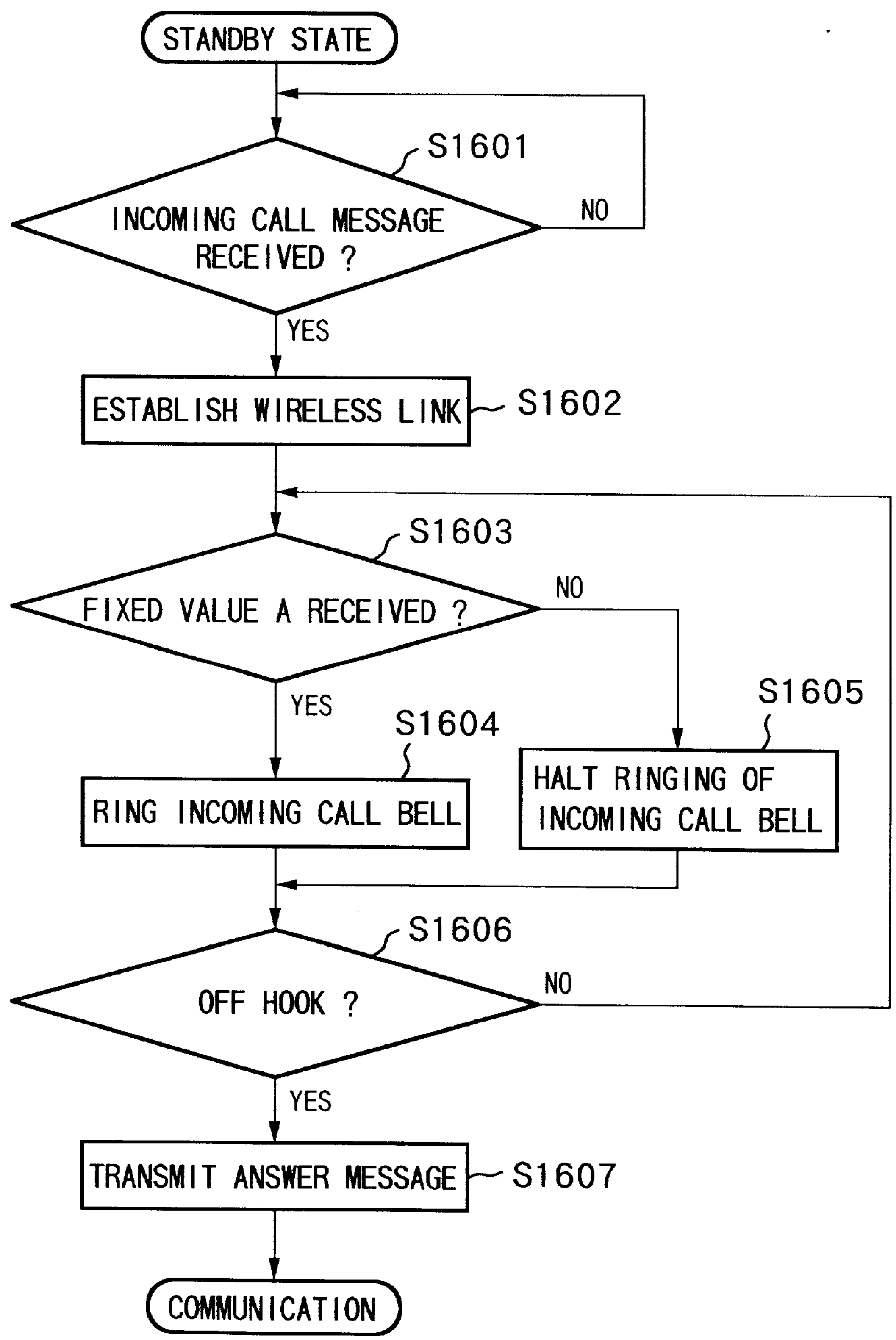
FIG. 16 is an flowchart showing the operation of a slave set according to the third embodiment.

FIG. 14 is a flowchart showing the operation of the main unit 1302 according to the third embodiment, and FIGS. 15 and 16 are flowcharts showing the operation of the master set 1307 and slave set 1311, respectively, according to the third embodiment.

This embodiment will now be described with reference to FIGS. 14, 15 and 16.

When notification of an incoming call from the telephone line 1301 is given by an incoming call signal having a fixed frequency (e.g., a 16-Hz incoming call signal in Japan or a 20-Hz incoming call signal in the USA), the main unit 1302 detects the incoming call at the line interface 1304 and the line interface 1304 notifies the master controller 1303 of the fact that the incoming call has been detected (step S1401 in FIG. 14). Upon detecting the incoming call, the main-unit controller 1303 of the main unit 1302 notifies the master set 1307 (S1402) of the incoming call via the extension interface 1305 using the control-information transfer channel of the extension 1306. When the master controller 1308 of the master set 1307 is notified of the incoming call (S1501 in FIG. 15) by the main unit 1302 via the main-unit interface 1309, the master controller 1308 sends the slave set 1311 an incoming call message (S1502) via the wireless interface 1310 to notify of the incoming call and establishes a wireless link with the slave set 1311 (S1503). When the establishment of the wireless link with the slave set 1311 has been completed, the master controller 1308 of the master set 1307 notifies the main unit 1302 of establishment of the wireless link using the control-information transfer channel of the extension 1306 (S1504). The method of giving notification of the incoming call and the method of establishing the wireless link are in line with the PHS standard. After the wireless link has been established (after notification of establishment of the wireless link has been received at S1403), the main-unit controller 1303 of the main unit 1302 continues transmitting a fixed value A to the slave set 1311 via the master set 1307 for as long as the incoming call signal is being detected by the line interface 1304 (S1404, S1405).

It is so arranged that the fixed value is not transmitted when the incoming call signal is not being detected by the extension interface 1304 (S1404, S1406). Communication is subsequently established if notification is received from the master set 1307 to the effect that the slave set has answered (S1407).

Upon receiving notification of the incoming call from the main unit 1302 (S1501) via the main-unit interface 1309, the master controller 1308 of the master set 1307 sends the slave set 1311 an incoming-call message via the wireless interface 1310 on the master side (S1502) and establishes a wireless link with the slave set 1311 (S1503).

When the wireless link with the slave set 1311 is established, the master controller 1308 sends the main unit 1302 notification of establishment of the link (S1504).

The master controller 1308 then transmits the signal, which has been sent from the main unit 1302, to the slave set 1311 via the wireless interface 1310 on the master side (S1505) and performs monitoring for an answer message from the slave set 1311 (S1506). Upon receiving an answer message from the slave set 1311 (S1506), the master controller 1308 sends notification of the answer to the main unit 1302 (S1507) and establishes communication.

Upon receiving an incoming call message from the master set 1307 via the wireless interface 1313 on the slave side (S1601), the slave controller 1312 of the slave set 1311 establishes a wireless link with the master set 1307 (S1602)

After establishment of the physical link, the slave controller 1312 of the slave set 1311 rings the incoming call bell 1314 only while the fixed value A is being received by the wireless interface 1313 (S1603, S1604). The slave controller 1312 does not ring the incoming call bell 1314 for as long as the fixed value A is not being received (S1603, S1605).

If an off-hook operation at the control panel 1315 is detected (S1606), the slave controller 1312 transmits an answer message to the master set 1307 via the wireless interface 1313 on the slave side (S1607), thereby establishing communication.

An example of a method of sending and receiving the fixed value A is one which maps the fixed value to an information channel (TCH) stipulated by the PHS standard. A mapping of the entire area of the information channel (TCH) by "1"s, as shown in FIG. 6, and a mapping of the entire area of the information channel (TCH) by "0"s, as shown in FIG. 7, are examples of the fixed value A.

In this case, the main-unit controller 1303 of the main unit 1302 transmits a message, in which all bits of the voice-information transfer channel of the extension 1306 have been mapped to "1"s (or "0"s), to the slave set 1311 via the master set 1307 for as long as the incoming call signal is being sensed. Further, the master controller 1308 of the master set 1307 currently communicating subjects voice information, which has been transferred from the main unit 1302 on the voice-information transfer channel of the extension 1306, to a conversion in such a manner that it can be transferred on the information channel (TCH). Voice coding in accordance with the PHS standard uses 32-kbps ADPCM (Adaptive Differential Pulse Code Modulation). Therefore, in a case where 64-kbps PCM (Pulse Code Modulation) is used as the voice coding scheme of the voice-information transfer channel of the extension 1306, a conversion from 64-kbps PCM to 32-kbps ADPCM is carried out. However, in a case where the master controller 1308 of the master set 1307 does not perform the above-mentioned conversion at the time of an incoming call and the bits of the voice-information transfer channel of the extension 1306 have been mapped to "1"s (or "0"s), the area of the information channel (TCH) is mapped to "1"s (or "0"s). The slave controller 1312 of the slave set 1311 causes the incoming call bell 1314 to ring in a case where a message in which the entire area of the information channel (TCH) has been mapped to "1"s (or "0"s) is received.

It is so arranged that the above-mentioned conversion is made when communication begins. The reason for this is that when the conversion is applied to a signal that requires immediacy, such as a signal for ringing the bell at the time of an incoming call, time is needed for the conversion on the transmitting side and time is needed for the restoration on the receiving side and this would cause immediacy to be lost.

Further, in the third embodiment set forth above, it is so arranged that the fixed value is transmitted to the slave set when the line interface is detecting the incoming call signal. However, an arrangement may be adopted in which the transmission of the fixed value is not carried out when the incoming call signal is being detected or in which the fixed value is transmitted when the incoming call signal is not detected. In such case the slave-set controller of the slave set rings the incoming call bell for as long as the constant value cannot be received and does not ring the incoming call bell for as long as the constant value is being received. This makes it possible to reflect the pattern of the incoming call signal from the telephone line in the way the bell is rung at the slave set.

Fourth Embodiment

The construction of a digital wireless telephone apparatus according to a fourth embodiment is the same as that shown in FIG. 13 and need not be described again.

Figure 17:
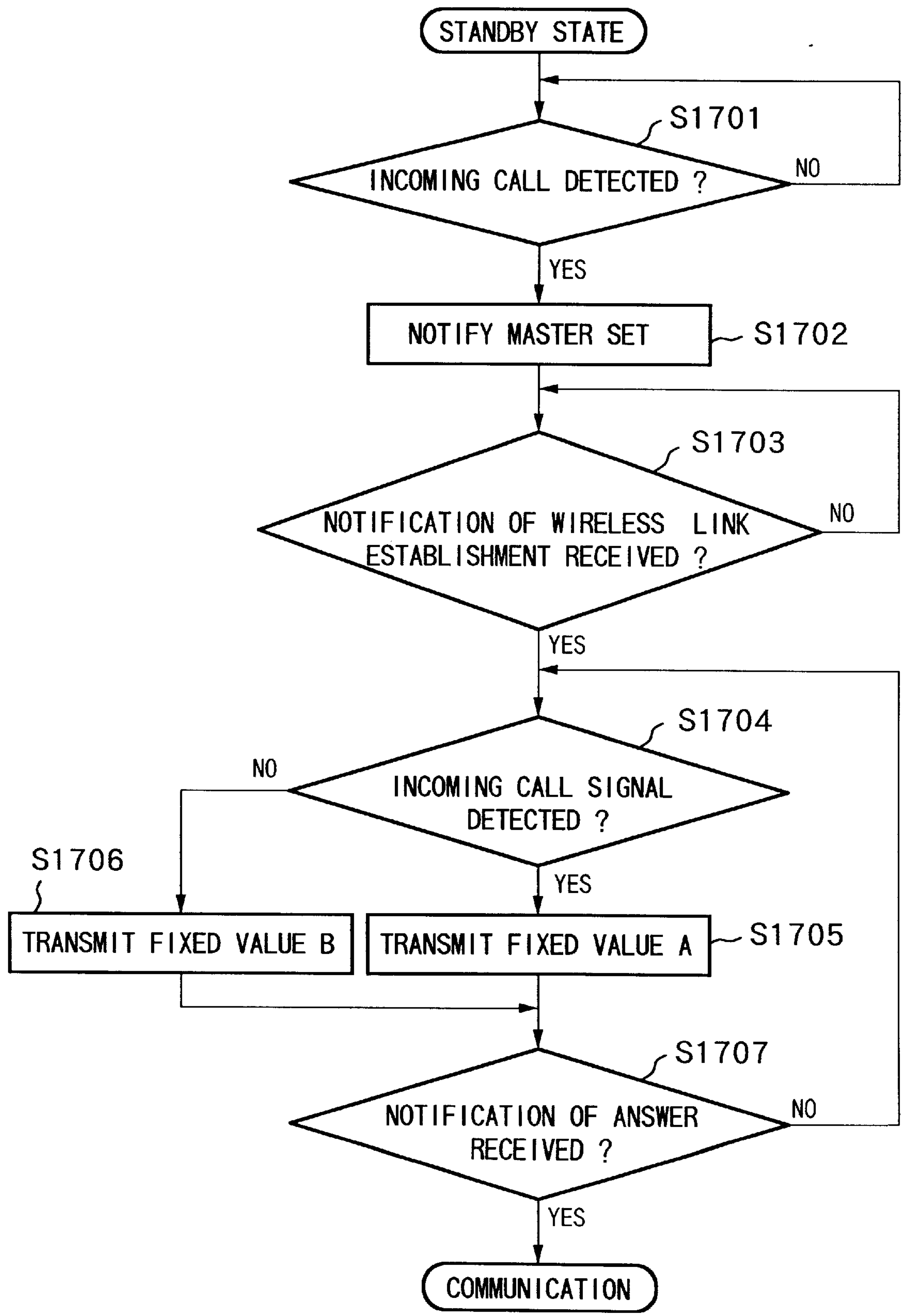
FIG. 17 is an flowchart showing the operation of a main unit according to the third embodiment.
Figure 18:
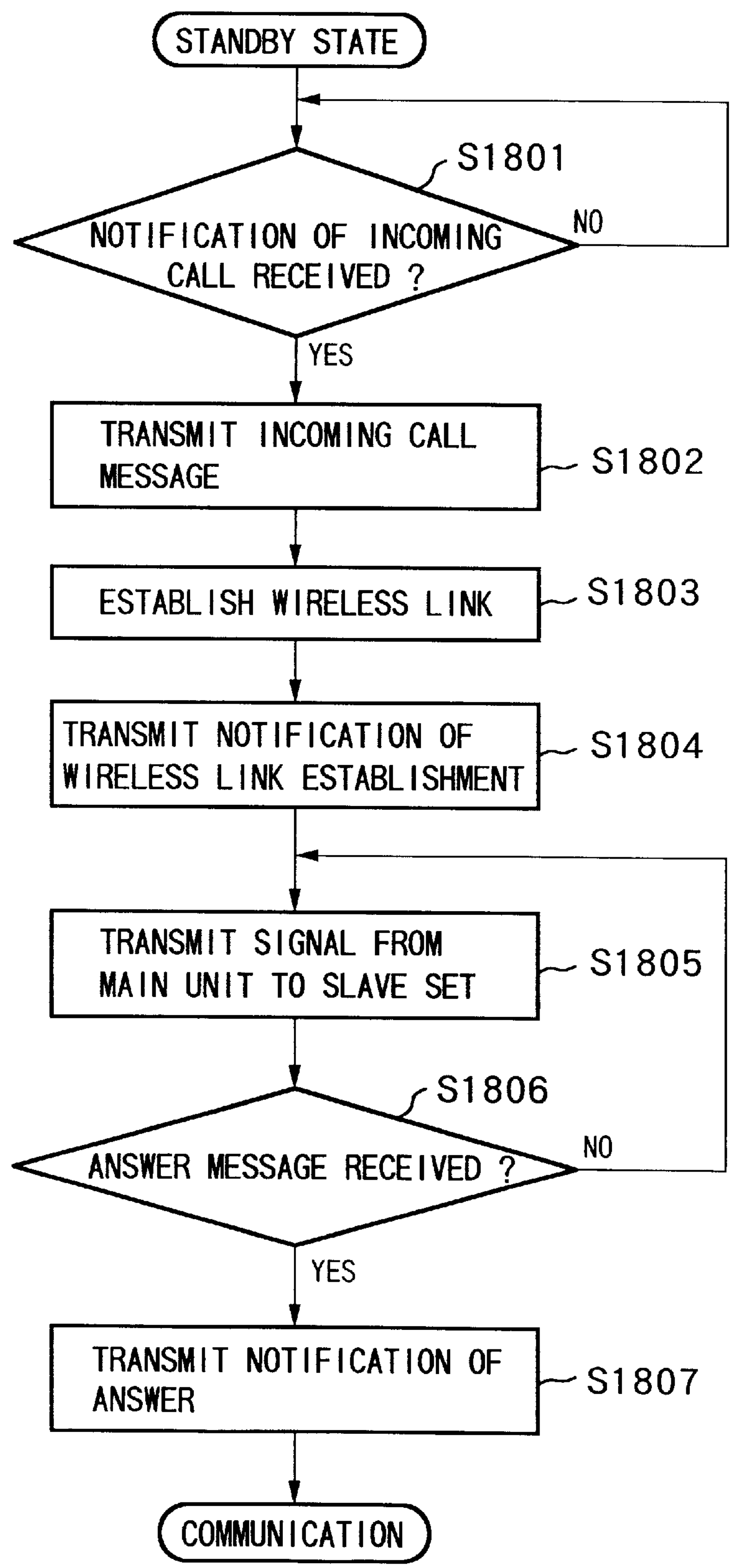
FIG. 18 is an flowchart showing the operation of a master set according to the fourth embodiment.
Figure 19:
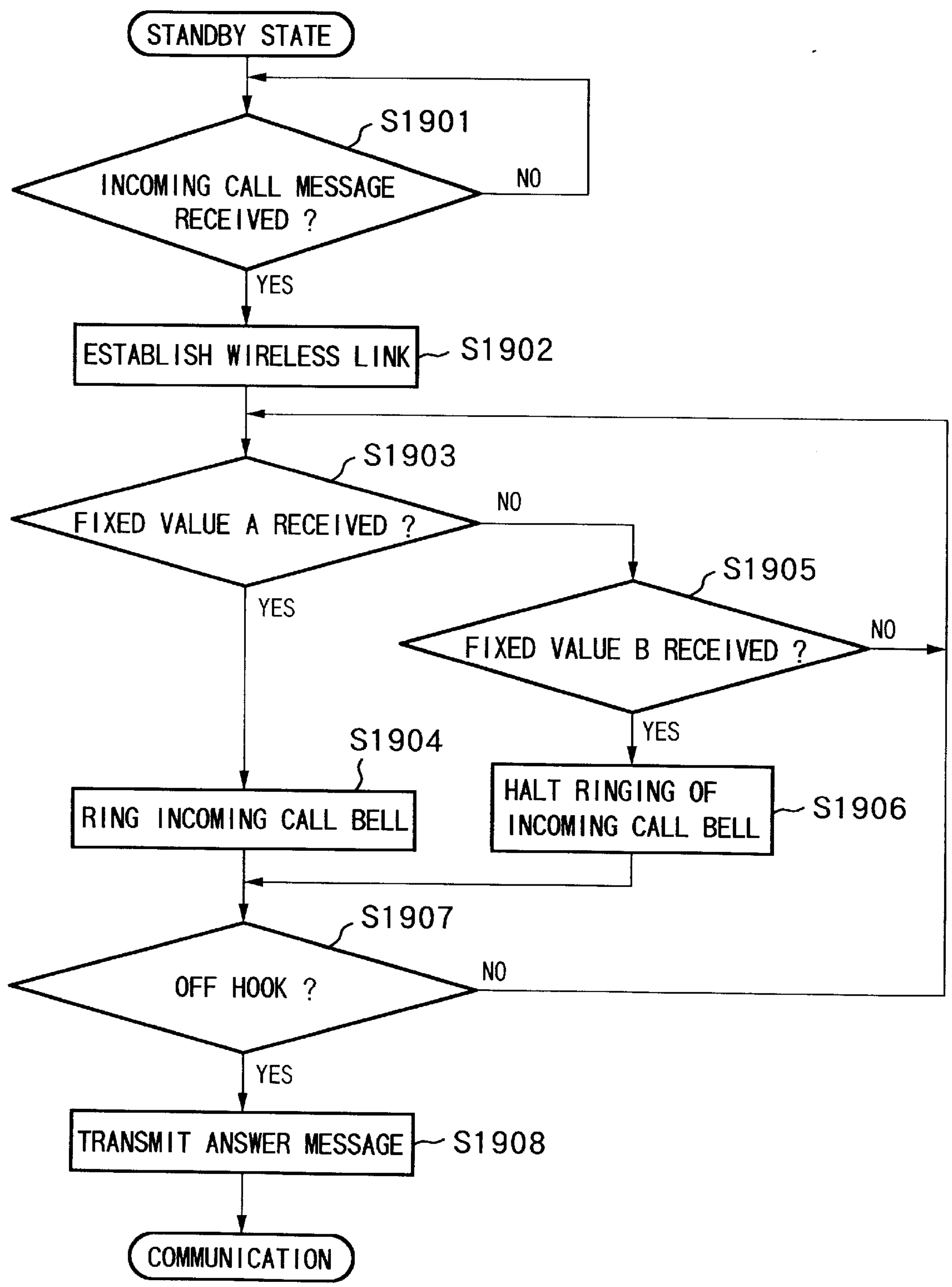
FIG. 19 is an flowchart showing the operation of a slave set according to the fourth embodiment.

FIGS. 17, 18 and 19 are flowcharts showing the operation of the main unit 1302, the master set 1307 and slave set 1311, respectively, according to the fourth embodiment of the invention.

This embodiment will now be described with reference to FIGS. 14, 15 and 16.

When notification of an incoming call from the telephone line 1301 is given by an incoming call signal having a fixed frequency (e.g., a 16-Hz incoming call signal), the main unit 1302 detects the incoming call at the line interface 1304 and the line interface 1304 notifies the master controller 1303 of the fact that the incoming call has been detected (step S1701 in FIG. 17). Upon being notified of the incoming call, the main-unit controller 1303 notifies the master set 1307 (S1702) of the incoming call via the extension interface 1305 using the control-information transfer channel of the extension 1306. When the master controller 1308 of the master set 1307 is notified of the incoming call (S1801 in FIG. 18) by the main unit 1302 via the main-unit interface 1309, the master controller 1308 sends the slave set 1311 an incoming call message (S1802) via the wireless interface 1310 to notify of the incoming call and establishes a wireless link with the slave set 1311 (S1803). When the establishment of the wireless link with the slave set 1311 has been completed, the master controller 1308 of the master set 1307 notifies the main unit 1302 of establishment of the wireless link using the control-information transfer channel of the extension 1306 (S1804). The method of giving notification of the incoming call and the method of establishing the wireless link are in line with the PHS standard.

Upon receiving notification of establishment of the wireless Link from the master set 1307, the main-unit controller 1303 of the main unit 1302 continues transmitting a fixed value A to the slave set 1311 via the master set 1307 for as long as the incoming call signal is being detected by the line interface 1304 (S1704, S1705). The main-unit controller 1303 continues transmitting a fixed value B to the slave set 1311 via the master set 1307 as long as an incoming call signal is not being detected by the line interface 1304 (S1704, S1706).

In the meantime, the master controller 1308 of the master set 1307 transmits the signal, which is sent from the main unit 1302, from its wireless interface 1310.

Upon receiving an incoming call message from the master set 1307 via the wireless interface 1313 on the slave side (S1901), the slave controller 1312 of the slave set 1311 establishes a wireless link with the master set 1307 (S1902) The slave controller 1312 then performs monitoring to determine whether the signal transmitted by the main unit 1302 via the master set 1307 is the fixed value A or the fixed value B (S1903, S1905). The slave controller 1312 rings the incoming call bell 1314 (S1904) in case of the fixed value A but does not ring the incoming call bell 1314 (S1906) in case of the fixed value B.

If an off-hook operation at the control panel 1315 of the slave set 1311 is detected (S1907), the slave controller 1312 transmits an answer message to the master set 1307 via the wireless interface 1313 on the slave side (S1908), thereby establishing communication.

Upon receiving an answer message from the slave set 1311 (S1806), the master controller 1308 of the master set 1307 sends notification of the answer to the main unit 1302 (S1807) and establishes communication.

When the main unit 1302 receives notification of the answer from the master set 1307 (S1707), communication is established.

An example of a method of sending and receiving the fixed values A and B is one which maps the fixed values to an information channel (TCH) stipulated by the PHS standard. For example, the bell is rung in a case where the bits of the information channel (TCH) are "1"s and ringing is halted in a case where the bits are "0"s, as shown in FIG. 10.

In this case, the master controller 1303 of the main unit 1302 makes the bits of the voice-information transfer channel of the extension 1306 "1"s for as long as an incoming call signal is being detected and makes the bits of the voice-information transfer channel of the extension 1306 "0"s for as long as an incoming call signal is being detected. Further, the master controller 1308 of the master set 1307 currently communicating subjects voice information, which has been transferred from the main unit 1302 on the voice-information transfer channel of the extension 1306, to a conversion in such a manner that it can be transferred on the information channel (TCH). Voice coding in accordance with the PHS standard uses 32-kbps ADPCM. Therefore, in a case where 64-kbps PCM is used as the voice coding scheme of the voice-information transfer channel of the extension 1306, a conversion from 64-kbps PCM to 32-kbps ADPCM is carried out. However, in a case where the master controller 1308 of the master set 1307 does not perform the above-mentioned conversion at the time of an incoming call and the bits of the voice-information transfer channel of the extension 1306 have been mapped to "1"s, the area of the information channel (TCH) is mapped to "1"s. In a case where the bits of the voice-information transfer channel of the extension 1306 have been mapped to "0"s, the area of the information channel (TCH) is mapped to "0"s. A message containing the above-mentioned information channel (TCH) continues being transmitted to the slave set 1311.

The reason for this is that when the conversion is applied to a signal that requires immediacy, such as a signal for ringing the bell at the time of an incoming call, time is needed for the conversion on the transmitting side and time is needed for the restoration on the receiving side and this would cause immediacy to be lost.

In a case where the slave set 1311 has received the message containing the information channel (TCH) from the master set 1307, the incoming call bell 1314 is rung when a bit of the information channel (TCH) area is "1" and is not rung when a bit of the information channel (TCH) area is "0".

Thus, in accordance with the third and fourth embodiments, intermittence of the incoming call signal on the telephone line 1301 can be reflected in the ringing of the incoming call bell of the slave set. For example, in a scenario in which a push-button telephone apparatus accommodating a digital wireless telephone as an extension is connected to an extension of a private branch exchange, the user of the slave set will be capable of recognizing the type of originator by the difference in the ringing pattern of the incoming call bell. In particular, if the method of using the information channel (TCH) set forth in the second and fourth embodiments is used, the above can be achieved by simple logic wherein the bell is caused to ring when "1" has been mapped and is not caused to ring when "0" has been mapped. This makes design simpler in comparison with the first and third embodiments.

Fifth Embodiment

The construction of a digital wireless telephone apparatus according to a fifth embodiment is the same as that shown in FIG. 1.

According to the fifth embodiment, an incoming call signal is detected by the line interface 104, the pattern of intermittence of the incoming call signal is discriminated and the slave set is notified of the pattern discriminated. The incoming call bell of the slave set is then caused to ring in accordance with the pattern.

Figure 20:
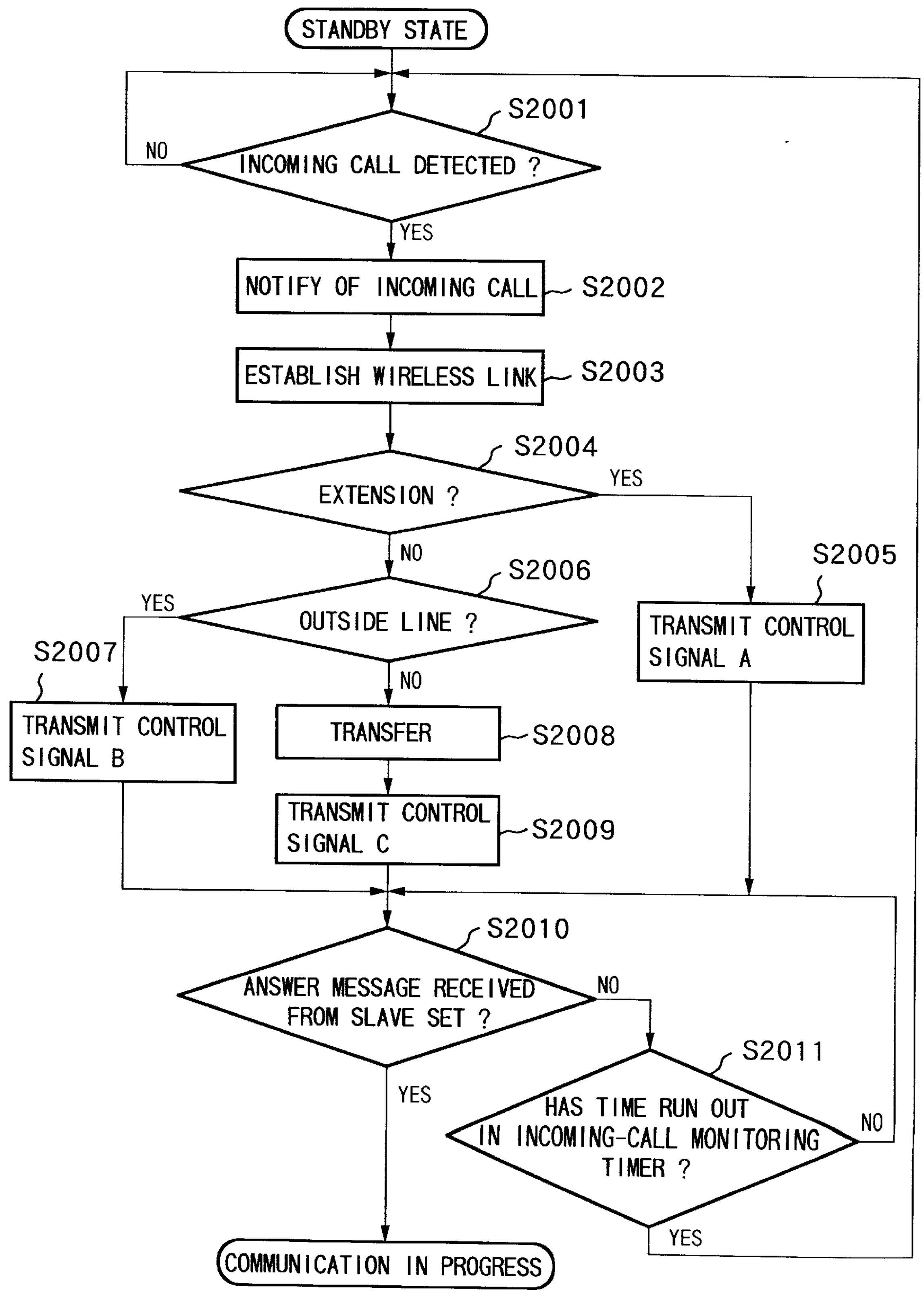
FIG. 20 is an flowchart showing the operation of a master set according to a fifth embodiment.
Figure 21:
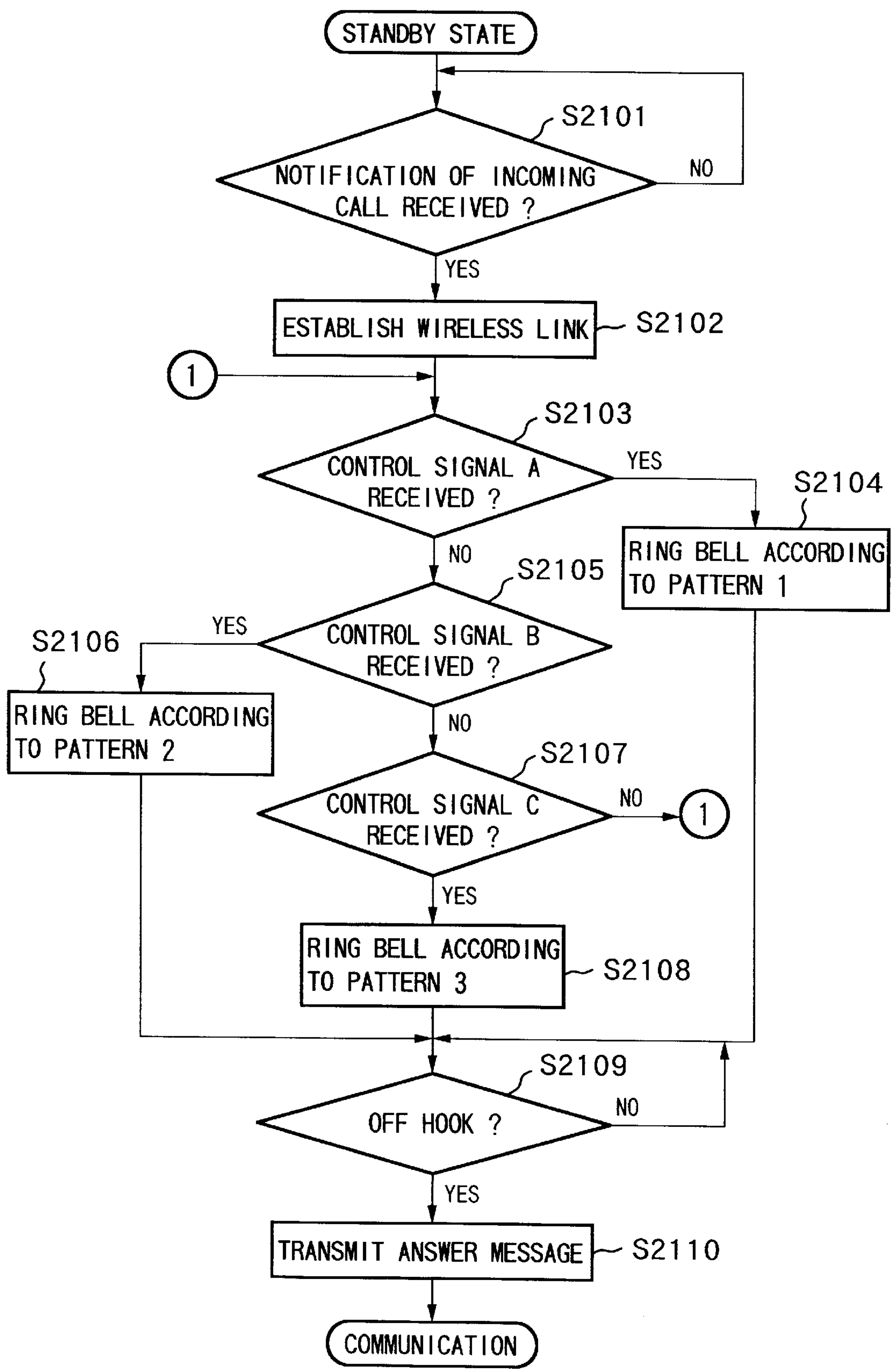
FIG. 21 is an flowchart showing the operation of a slave set according to the fifth embodiment.

FIGS. 20 and 21 are flowcharts showing the operation of the master set 102 and slave set 106, respectively, according to this embodiment of the invention.

When an incoming call from the telephone line 101 is detected by the line interface 104 of the master set 102 at step S2001, the master controller 103 causes the line interface 104 to discriminate the intermittent pattern of the incoming call signal, notifies the slave set 106 of the incoming call at step S2002 and establishes a wireless link with the slave set 106 at step S2003.

On the basis of the intermittent pattern of the incoming call signal discriminated by the line interface 104, the master controller 103 determines whether the incoming call is from an extension or outside line or is a transfer from an outside line (S2004, S2006, S2008). To accomplish this, the line interface 104 determines whether the incoming call from the telephone line 101 is Pattern 1, Pattern 2 or Pattern 3 shown in FIG. 22 and notifies the master controller 103 of the pattern. The master controller 103 determines, based upon the pattern, whether the incoming call is from an extension or outside line or is a transfer from an outside line.

Figure 22:
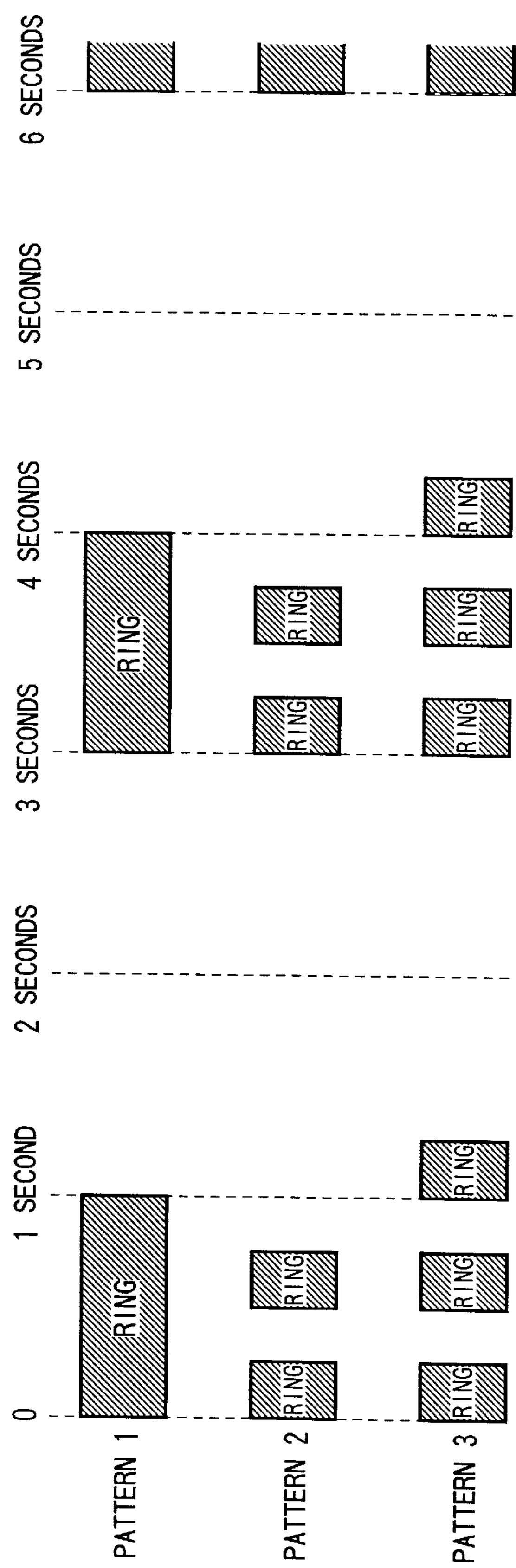
FIG. 22 illustrates an example of a pattern representing the intermittence of an incoming call signal in a telephone exchange according to the prior art.

If the master controller 103 is notified by the line interface 104 of the fact that the incoming call from the telephone line 101 is Pattern 1 in FIG. 22, the master controller 103 judges that the incoming call is from the extension and so notifies the slave set 106 by sending it a control signal A (S2004, S2005). If the master controller 103 is notified by the line interface 104 of the fact that the incoming call from the telephone line 101 is Pattern 2 in FIG. 22, the master controller 103 judges that the incoming call is from the outside line and so notifies the slave set 106 by sending it a control signal B (S2006, S2007). If the master controller 103 is notified by the line interface 104 of the fact that the incoming call from the telephone line 101 is Pattern 3 in FIG. 22, the master controller 103 judges that the incoming call is a transfer from the outside line and so notifies the slave set 106 by sending it a control signal B (S2008, S2009).

Communication is established when an answer message is received from the slave set 106 at step S2010.

If the answer message is not received from the slave set 106 at step S2010, the incoming call monitoring timer is monitored at step S2011 to determine whether the timer has run out of time. The program returns to step S2010 if time has not run out and to step S2001 if time has run out.

When notification of an incoming call is received from the master set 102 at step S2101 in FIG. 21, the slave controller 107 of the slave set 106 establishes a wireless link with the master set 102 (S2012). The slave controller 107 causes the incoming call bell 109 to ring in accordance with Pattern 1 of FIG. 22 (S2104) if the control signal A is received from the master set 102 (S2103), in accordance with Pattern 2 of FIG. 22 (S2106) if the control signal B is received from the master set 102 (S2105), and in accordance with Pattern 3 of FIG. 22 (S2108) if the control signal C is received from the master set 102 (S2107).

If an off-hook operation is performed at the control panel 110 (S2109), the slave controller 107 transmits an answer message to the master set 102 (S2110), thereby establishing communication.

Thus, in accordance with the present invention as described above, the intermittence of an incoming call signal from a line can be reflected in the way an incoming call bell of a wireless communication apparatus is caused to ring. This makes it possible for the user to determine the type of originator (extension, outside line, transfer, etc.) based upon the difference in the way the incoming call bell of the wireless communication apparatus is rung.

In the description rendered above, the PHS is mentioned as being one example of a digital cordless telephone system. However, the present invention is applicable also to other digital cordless telephone systems, such as CT-2, CT-3, DECT (Digital European Cordless Telephone) and UDPC (Universal Digital Portable Communications) systems, as well as to other wireless telephones and wireless communications systems.

As many apparently widely different embodiments of the present invention can be made without departing from the spirit and scope thereof, it is to be understood that the invention is not limited to the specific embodiments thereof except as defined in the appended claims.

What is claimed is:

1. A wireless communications system having a master set accommodating a communication line and a slave set wirelessly connected to the master set, said master set comprising:

incoming call signal detecting means for detecting intermittence of an incoming call signal from the communication line; and transmitting means, responsive to a detection of intermittence by said incoming call detection means, for storing first information which reflects the intermittence of the incoming call signal into a first communication frame in a first method, and transmitting the communication frame to the slave set, and, when communicating to the slave set after a response to the incoming call by the slave set, for storing second information from a communication line into a second communication frame in a second method, said second method being different than said first method, and transmitting the second communication frame to the slave; and said slave set comprising:

receiving means for receiving the first and second frames transmitted by said transmitting means; and control means, when informed of the incoming call from the master set, for giving notification of the incoming call while causing the notification to reflect a pattern of intermittence of the incoming call signal from the communication line based upon the first information stored in the first communication frame in the first method, and, when communicating from the master set after the response to the incoming call, for outputting the second information stored in the second communication frame in the second method as a voice signal.

2. The system according to claim 1, wherein said transmitting means transmits the information while the incoming call signal from the communication line is being detected by said incoming call signal detecting means, and refrains from transmitting the information while the incoming call signal is not being detected by said incoming call detecting means.

3. The system according to claim 1, wherein said transmitting means transmits information of one type in a case where the incoming call signal from the communication line is being detected by said incoming call signal detecting means, and information of a different type when the incoming call signal is not being detected by said incoming call signal detecting means.

4. The system according to claim 1, wherein said transmitting means transmits information, which indicates the pattern of intermittence of the incoming call signal, to said slave set.

5. The system according to claim 1, wherein said control means gives notification of the incoming call using a ringing tone.

6. The system according to claim 5, wherein said control means produces a ringing tone while the information is being received by said receiving means, and refrains from producing a ringing tone while the information is not being received by said receiving means.

7. The system according to claim 5, wherein said control means produces a ringing tone while first information is being received by said receiving means, and refrains from producing a ringing tone while second information is being received by said receiving means.

8. The system according to claim 1, wherein said transmitting means transmits the information using an information channel in a digital cordless telephone system.

9. The system according to claim 8, wherein said digital cordless telephone system is a Personal Handy-Phone System.

10. The system according to claim 1, wherein in said second method, information from a communication line is compressed and stored into a communication frame, and, in said first method, information which reflects the intermittence of the incoming call signal, is stored into the communication frame without being compressed.

11. A wireless communications apparatus accommodating a communication line and wirelessly connected to an other wireless communications apparatus, comprising:

incoming call signal detecting means for detecting intermittence of an incoming call signal from the communication line; and transmitting means, responsive to a detection of intermittence by said incoming call detection means, for storing first information which reflects the intermittence of the incoming call signal, into a first communication frame in a first method, and transmitting the communication frame to the other wireless communication apparatus, and, when communicating to the other wireless communication apparatus after a response to the incoming call by the other wireless communication apparatus, for storing second information from a communication line into a second communication frame in a second method, said second method being different than said first method, and transmitting the second communication frame to the other wireless communication apparatus.

12. The apparatus according to claim 11, wherein said transmitting means transmits the information while the incoming call signal from the communication line is being detected by said incoming call signal detecting means, and refrains from transmitting the information while the incoming call signal is not being detected by said incoming call detecting means.

13. The apparatus according to claim 1, wherein said transmitting means transmits information of one type in a case where the incoming call signal from the communication line is being detected by said incoming call signal detecting means, and information of a different type when the incoming call signal is not being detected by said incoming call signal detecting means.

14. The apparatus according to claim 11, wherein said transmitting means transmits information, which indicates the pattern of intermittence of the incoming call signal, to the other wireless communications apparatus.

15. The apparatus according to claim 11, wherein said transmitting means transmits the information using an information channel in a digital cordless telephone system.

16. The apparatus according to claim 15, wherein said digital cordless telephone system is a Personal Handy-Phone System.

17. The apparatus according to claim 11, wherein in said second method, information from a communication line is compressed and stored into a communication frame, and in said first method, information which reflects the intermittence of the incoming call signal, is stored into the communication frame without being compressed.

18. A wireless communications apparatus wirelessly connected to an other wireless communications apparatus which accommodates a communication line, comprising:

receiving means for receiving first information which reflects intermittence of an incoming call signal from the communication line, stored into a first communication frame in a first method and transmitted by the other wireless communications apparatus to inform an incoming call by the other wireless communication apparatus from the communication line, and second information from the communication line, stored into a second communication frame in a second method and transmitted by the other wireless communication apparatus after a response to the incoming call; and control means, when informed the incoming call from the other wireless communication apparatus, for giving notification of the incoming call while causing the notification to reflect a pattern of intermittence of the incoming call signal from the communication line based upon the first information stored in the first communication frame in the first method, and, when communicating from the other wireless communication apparatus after the response to the incoming call, for outputting the second information stored in the second communication frame in the second method as a voice signal.

19. The apparatus according to claim 18, wherein said control means gives notification of the incoming call using a ringing tone.

20. The apparatus according to claim 18, wherein said control means gives said notification while the information is being received by said receiving means, and refrains from giving said notification while the information is not being received by said receiving means.

21. The apparatus according to claim 18, wherein said control means gives said notification while first information is being received by said receiving means, and refrains from giving said notification while second information is being received by said receiving means.

22. The apparatus according to claim 18, wherein said receiving means receives the information using an information channel in a digital cordless telephone system.

23. The apparatus according to claim 22, wherein said digital cordless telephone system is a Personal Handy-Phone System.

24. The apparatus according to claim 18, wherein in said second method, information from a communication line is compressed and stored into a communication frame, and in said first method, information which reflects the intermittence of the incoming call signal, is stored into the communication frame without being compressed.

25. A method of controlling a wireless communications system having a master set accommodating a communication line and a slave set wirelessly connected to the master set, comprising:

an incoming call signal detecting step of said master set detecting intermittence of an incoming call signal from the communication line; and a transmitting step of said master set transmitting first information, responsive to a detection of intermittence by said incoming call signal, which reflects the intermittence of the incoming call signal, into a first communication frame in a first method, and transmitting the communication frame to the other wireless communication apparatus, and, when communicating to the other wireless communication apparatus after a response to the incoming call by the slave set, for storing second information from a communication line into a second communication frame in a second method, said second method being different than said first method, and transmitting the second communication frame to the other wireless communication apparatus;

a receiving step of said slave set receiving the first and second frames from the communication line, transmitted at said transmitting step; and a control step, when informed of the incoming call from the master set, giving notification of the incoming call while causing the notification to reflect a pattern of intermittence of the incoming call signal from the communication line based upon the first information, stored in the first communication frame in the first method, and, when communicating from the master set after the response to the incoming call, for outputting the second information stored in the second communication frame in the second method as a voice signal.

26. The method according to claim 25, wherein said transmitting step transmits the information while the incoming call signal from the communication line is being detected at said incoming call signal detecting step, and refrains from transmitting the information while the incoming call signal is not being detected at said incoming call detecting step.

27. The method according to claim 25, wherein said transmitting step transmits information of one type in a case where the incoming call signal from the communication line is being detected at said incoming call signal detecting step, and information of a different type when the incoming call signal is not being detected at said incoming call signal detecting step.

28. The method according to claim 25, wherein said transmitting step transmits information, which indicates the pattern of intermittence of the incoming call signal, to said slave set.

29. The method according to claim 25, wherein said control step gives notification of the incoming call using a ringing tone.

30. The method according to claim 29, wherein said control step produces a ringing tone while the information is being received at said receiving step, and refrains from producing a ringing tone while the information is not being received at said receiving step.

31. The method according to claim 29, wherein said control step produces a ringing tone while first information is being received at said receiving step, and refrains from producing a ringing tone while second information is being received at said receiving step.

32. The method according to claim 25, wherein said transmitting step transmits the information using an information channel in a digital cordless telephone system.

33. The method according to claim 32, wherein said digital cordless telephone system is a Personal Handy-Phone System.

34. The method according to claim 25, wherein in said second method, information from a communication line is compressed and stored into a communication frame, and in said first method, information which reflects the intermittence of the incoming call signal, is stored into the communication frame without being compressed.

35. A method of controlling a wireless communications apparatus accommodating a communication line and wirelessly connected to an other wireless communications apparatus, comprising:

an incoming call signal detecting step of detecting intermittence of an incoming call signal from the communication line; and a transmitting step, responsive to a detection of intermittence by said incoming call detection means, of storing first information which reflects the intermittence of the incoming call signal from the communication line, into a first communication frame in a first method, and transmitting the communication frame to the other wireless communication apparatus, and, when communicating to the other wireless communication apparatus after a response to the incoming call by the other wireless communication apparatus, for storing second information from a communication line into a second communication frame in a second method, said second method being different than said first method, and transmitting the second communication frame to the other wireless communication apparatus.

36. The method according to claim 35, wherein said transmitting step transmits the information while the incoming call signal from the communication line is being detected at said incoming call signal detecting step, and refrains from transmitting the information while the incoming call signal is not being detected at said incoming call detecting step.

37. The method according to claim 36, wherein said transmitting step transmits information of one type in a case where the incoming call signal from the communication line is being detected at said incoming call signal detecting step, and information of a different type when the incoming call signal is not being detected at said incoming call signal detecting step.

38. The method according to claim 35, wherein said transmitting step transmits information, which indicates the pattern of intermittence of the incoming call signal, to the other wireless communications apparatus.

39. The method according to claim 35, wherein said transmitting step transmits the information using an information channel in a digital cordless telephone system.

40. The method according to claim 39, wherein said digital cordless telephone system is a Personal Handy-Phone System.

41. The method according to claim 35, wherein in said second method, information from a communication line is compressed and stored into a communication frame, and in said first method, information which reflects the intermittence of the incoming call signal, is stored into the communication frame without being compressed.

42. A method of controlling a wireless communications apparatus wirelessly connected to an other wireless communications apparatus which accommodates a communication line comprising:

a receiving step of receiving first information which reflects intermittence of an incoming call signal from the communication line, stored into a first communication frame in a first method and transmitted by the other wireless communications apparatus to inform an incoming call by the other wireless communication apparatus from the communication line, and second information from the communication line, stored into a second communication frame in a second method and transmitted by the other wireless communication apparatus after a response to the incoming call; and a control step, when informed of the incoming call from the other wireless communication apparatus, giving notification of the incoming call while causing the notification to reflect a pattern of intermittence of the incoming call signal from the communication line based upon the first information stored in the first communication frame in the first method, and, when communicating from the other wireless communication apparatus after the response to the incoming call, for outputting the second information stored in the second communication frame in the second method as a voice signal.

43. The method according to claim 42, wherein said control step gives notification of the incoming call using a ringing tone.

44. The method according to claim 42, wherein said control step gives said notification while the information is being received at said receiving step, and refrains from giving said notification while the information is not being received at said receiving step.

45. The method according to claim 42, wherein said control step gives said notification while first information is being received at said receiving step, and refrains from giving said notification while second information is being received at said receiving step.

46. The method according to claim 42, wherein said receiving step receives the information using an information channel in a digital cordless telephone system.

47. The method according to claim 46, wherein said digital cordless telephone system is a Personal Handy-Phone System.

48. The method according to claim 42, wherein in said second method, information from a communication line is compressed and stored into a communication frame, and in said first method, information which reflects the intermittence of the incoming call signal, is stored into the communication frame without being compressed.

49. A program storage device readable by a machine, tangibly embodying a program of instructions executable by the machine to perform method steps for controlling a wireless communications apparatus accommodating a communication line and wirelessly connected to an other wireless communications apparatus, said method steps comprising:

an incoming call signal detecting step of detecting intermittence of an incoming call signal from the communication line; and a transmitting step, responsive to a detection of intermittence by said incoming call detection means, of storing first information which reflects the intermittence of the incoming call signal from the communication line, into a first communication frame in a first method, and transmitting the communication frame to the other wireless communication apparatus, and, when communicating to the other wireless communication apparatus after a response to the incoming call by the other wireless communication apparatus, for storing second information from a communication line into a second communication frame in a second method, said second method being different than said first method, and transmitting the second communication frame to the other wireless communication apparatus.

50. The device according to claim 49, wherein said transmitting step transmits the information while the incoming call signal from the communication line is being detected at said incoming call signal detecting step, and refrains from transmitting the information while the incoming call signal is not being detected at said incoming call detecting step.

51. The device according to claim 49, wherein said transmitting step transmits information of one type in a case where the incoming call signal from the communication line is being detected at said incoming call signal detecting step, and information of a different type when the incoming call signal is not being detected at said incoming call signal detecting step.

52. The device according to claim 49, wherein said transmitting step transmits information, which indicates the pattern of intermittence of the incoming call signal, to the other wireless communications apparatus.

53. The device according to claim 49, wherein said transmitting step transmits the information using an information channel in a digital cordless telephone system.

54. The device according to claim 53, wherein said digital cordless telephone system is a Personal Handy-Phone System.

55. The device according to claim 49, wherein in said second method, information from a communication line is compressed and stored into a communication frame, and in said first method, information which reflects the intermittence of the incoming call signal, is stored into the communication frame without being compressed.

56. A program storage device readable by a machine, tangibly embodying a program of instructions executable by the machine to perform method steps for controlling a wireless communications, apparatus wirelessly connected to an other wireless communications apparatus which accommodates a communication line, comprising:

a receiving step of receiving first information which reflects intermittence of an incoming call signal from the communication line, stored into a first communication frame in a first method and transmitted by the other wireless communications apparatus to inform an incoming call by the other wireless communication apparatus from the communication line, and second information from the communication line, stored into a second communication frame in a second method, said second method being different than said first method, and transmitted by the other wireless communication apparatus after a response to the incoming call; and a control step, when informed of the incoming call from the other wireless communication apparatus, giving notification of the incoming call while causing the notification to reflect a pattern of intermittence of the incoming call signal from the communication line based upon the first information stored in the first communication frame in the first method, and, when communicating from the other wireless communication apparatus after the response to the incoming call, for outputting the second information stored in the second communication frame in the second method as a voice signal.

57. The device according to claim 56, wherein said incoming call notification step gives notification of the incoming call using a ringing tone.

58. The device according to claim 56, wherein said incoming call notification step gives said notification while the information is being received at said receiving step, and refrains from giving said notification while the information is not being received at said receiving step.

59. The device according to claim 56, wherein said incoming call notification step gives said notification while first information is being received at said receiving step, and refrains from giving said notification while second information is being received at said receiving step.

60. The device according to claim 56, wherein said receiving step receives the information using an information channel in a digital cordless telephone system.

61. The device according to claim 60, wherein said digital cordless telephone system is a Personal Handy-Phone System.

62. The device according to claim 56, wherein in said second method, information from a communication line is compressed and stored into a communication frame, and in said first method, information which reflects the intermittence of the incoming call signal, is stored into the communication frame without being compressed.

63. A wireless communications system having a master set accommodating a communication line and a slave set wirelessly connected to the master set, said master set comprising:

incoming call signal detecting means for detecting intermittence of an incoming call signal from the communication line; and transmitting means, when informing an incoming call to the slave set, for continuously transmitting information indicating that the incoming call signal has been detected to the slave set while said incoming call signal detecting means is detecting the incoming call signal, and said slave set comprising:

receiving means for receiving the information transmitted by said transmitting means; and control means for giving notification of the incoming call while said receiving means is receiving the information, and for stopping notification of the incoming call while said receiving means does not receive the information.

64. A wireless communications apparatus wirelessly connected to an other wireless communications apparatus which accommodates a communication line, comprising:

receiving means for receiving information indicating that the incoming call signal has been detected, said information being continuously transmitted by the other wireless communications apparatus while the other wireless communications apparatus is detecting the incoming call signal from the communication line; and control means for giving notification of the incoming call while said receiving means is receiving the information, and for stopping notification of the incoming call while said receiving means does not receive the information.

65. A method of controlling a wireless communications system having a master set accommodating a communication line and a slave set wirelessly connected to the master set, comprising:

an incoming call signal detecting step for detecting intermittence of an incoming call signal from the communication line; and a transmitting step of said master set transmitting information, when informing an incoming call to the slave set, for continuously transmitting information indicating that the incoming call signal has been detected to the slave set while said incoming call signal detecting step is detecting the incoming call signal, a receiving step of said slave set for receiving the information transmitted by said transmitting step; and a control step of said slave set for giving notification of the incoming call while said receiving step is receiving the information, and for stopping notification of the incoming call while said receiving step does not receive the information.

66. A method of controlling a wireless communications apparatus wirelessly connected to an other wireless communications apparatus which accommodates a communication line, comprising:

a receiving step for receiving information indicating that the incoming call signal has been detected, said information being continuously transmitted by the other wireless communications apparatus while the other wireless communications apparatus is detecting the incoming call signal from the communication line; and a control step for giving notification of the incoming call while said receiving step is receiving the information, and for stopping notification of the incoming call while said receiving step does not receive the information.

67. A program storage device readable by a machine, tangibly embodying a program of instructions executable by the machine to perform method steps for controlling a wireless communications system having a master set accommodating a communication line and a slave set wirelessly connected to the master set comprising:

an incoming call signal detecting step of said master set of detecting intermittence of an incoming call signal from the communication line; and a transmitting step of said master set, when informing an incoming call to the slave set, for continuously transmitting information indicating that the incoming call signal has been detected to the slave set while said incoming call signal detecting step is detecting the incoming call signal, a receiving step of said slave set for receiving the information transmitted by said transmitting step; and a control step of said slave set for giving notification of the incoming call while said receiving step is receiving the information, and for stopping notification of the incoming call while said receiving step does not receive the information.

68. A program storage device readable by a machine, tangibly embodying a program of instructions executable by the machine to perform method steps for controlling a wireless communications apparatus wirelessly connected to an other wireless communications apparatus which accommodates a communication line, comprising:

a receiving step for receiving information indicating that the incoming call signal has been detected, said information being continuously transmitted by the other wireless communications apparatus while the other wireless communications apparatus is detecting the incoming call signal from the communication line; and a control step for giving notification of the incoming call while said receiving step is receiving the information, and for stopping notification of the incoming call while said receiving step does not receive the information.

* * * * *

UNITED STATES PATENT AND TRADEMARK OFFICE

CERTIFICATE OF CORRECTION

PATENT NO. : 6,314,298 B1

DATED : November 6, 2001

INVENTOR(S) : Hiroki

It is certified that error appears in the above-identified patent and that said Letters Patent is hereby corrected as shown below:

Column 1,
Line 21, delete "in" and insert therefor -- is --

Column 2,
Line 52, delete "comprising" and insert therefor -- comprising, --

Column 3,
Line 22, delete " "1"; " and insert therefor -- "1"s; --

Column 5,
Line 28, delete "FIG.6" and insert therefor -- FIG.6, --
Line 46, delete " "1"s, " and insert therefor -- "0"s, --

Column 6,
Line 12, delete "is," and insert therefor -- is --
Line 19, delete "determined" and insert therefor -- determine --
Line 46, delete " "1" s " and insert therefor -- "1"s --

Column 7,
Line 34, delete "ROM end" and insert therefor -- ROM and --

Column 10,
Line 18, delete "Link" and insert therefor -- link --
Line 33, delete "(S1902)" and insert therefor -- (S1902). --

Column 19,
Line 20, delete "communications," and insert therefor -- communications --

Signed and Sealed this

Fourth Day of June, 2002

*Attest:*

JAMES E. ROGAN

*Attesting Officer* *Director of the United States Patent and Trademark Office*

UNITED STATES PATENT AND TRADEMARK OFFICE

CERTIFICATE OF CORRECTION

PATENT NO. : 6,314,298 B1
DATED : November 6, 2001
INVENTOR(S) : Hiroki

It is certified that error appears in the above-identified patent and that said Letters Patent is hereby corrected as shown below:

Title page,
Insert in Item [*] Notice: -- This patent issued on a continued prosecution application filed under 37 CFR 1.53(d), and is subject to the twenty year patent term provisions of 35 U.S.C. 154(a)(2). --

Signed and Sealed this

Twenty-second Day of April, 2003

JAMES E. ROGAN
*Director of the United States Patent and Trademark Office*